US012769428B2

(12) United States Patent
Han et al.

(10) Patent No.: US 12,769,428 B2
(45) Date of Patent: Oct. 20, 2026

(54) ELECTRONIC DEVICE

(71) Applicant: Samsung Display Co., Ltd., Yongin-si (KR)

(72) Inventors: Jeongyun Han, Yongin-si (KR); Yeri Jeong, Yongin-si (KR); Hayeong Nam, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/177,194

(22) Filed: Apr. 11, 2025

(65) Prior Publication Data

US 2025/0390193 A1 Dec. 25, 2025

(30) Foreign Application Priority Data

Jun. 19, 2024 (KR) ........................ 10-2024-0079618

(51) Int. Cl.
*G06F 3/044* (2006.01)

(52) U.S. Cl.
CPC .. *G06F 3/0446* (2019.05); *G06F 2203/04111* (2013.01); *G06F 2203/04112* (2013.01)

(58) Field of Classification Search
CPC .... G06F 3/0446; G06F 3/0445; G06F 3/0448; G06F 2203/04111; G06F 2203/04112; G06F 3/044
See application file for complete search history.

(56) References Cited

U.S. PATENT DOCUMENTS

| | | | | |
|---|---|---|---|---|
| 10,359,890 | B2 | 7/2019 | Nakamura et al. | |
| 2014/0168109 | A1* | 6/2014 | Kang | G06F 3/0448 345/173 |
| 2019/0258338 | A1* | 8/2019 | Park | G06F 3/0412 |
| 2021/0373705 | A1 | 12/2021 | Lee et al. | |
| 2021/0373708 | A1 | 12/2021 | Kim et al. | |
| 2022/0223656 | A1 | 7/2022 | Kim | |
| 2024/0114743 | A1 | 4/2024 | Park et al. | |

(Continued)

FOREIGN PATENT DOCUMENTS

| | | | |
|---|---|---|---|
| CN | 115756194 | A | 3/2023 |
| JP | 6418910 | B2 | 11/2018 |
| KR | 10-2021-0147149 | A | 12/2021 |

(Continued)

*Primary Examiner* — Brent D Castiaux
(74) *Attorney, Agent, or Firm* — Womble Bond Dickinson (US) LLP

(57) ABSTRACT

An electronic device includes: a first electrode including a plurality of first patterns, and a first bridge pattern electrically connected to the plurality of first patterns; a second electrode crossing the first electrode; a third electrode overlapping with at least a portion of the first electrode; and a fourth electrode crossing the third electrode, and including second patterns, and a second bridge pattern electrically connected to the second patterns. The first bridge pattern, the third electrode, and the second patterns are included in a first conductive layer. The plurality of first patterns, the second electrode, and the second bridge pattern are included in a second conductive layer on the first conductive layer. Each of the plurality of first patterns, the second electrode, and the second bridge pattern includes first mesh lines, and at least some of first end portions of the first mesh lines have a curvature.

19 Claims, 30 Drawing Sheets

(56) References Cited

U.S. PATENT DOCUMENTS

| | | | |
|---|---|---|---|
| 2024/0298501 | A1 | 9/2024 | Park et al. |
| 2025/0315133 | A1 | 10/2025 | Tang et al. |

FOREIGN PATENT DOCUMENTS

| | | | |
|---|---|---|---|
| KR | 10-2022-0113197 | A | 8/2022 |
| KR | 10-2023-0048188 | A | 4/2023 |
| KR | 10-2023-0135213 | A | 9/2023 |

* cited by examiner

ELECTRONIC DEVICE

CROSS-REFERENCE TO RELATED APPLICATION

The present application claims priority to and the benefit of Korean Patent Application No. 10-2024-0079618, filed on Jun. 19, 2024, in the Korean Intellectual Property Office, the entire disclosure of which is incorporated by reference herein.

BACKGROUND

Aspects of embodiments of the present disclosure relate to an electronic device having improved visibility.

Multimedia electronic devices, such as televisions, mobile phones, tablet computers, laptops, navigation devices, and game consoles, include a display device for displaying an image. In addition to input methods using a button, a keyboard, a mouse, and the like, the electronic devices may include a sensor layer (e.g., an input sensor) capable of providing a touch-based input method to enable a user to input information or a command more easily, intuitively, and conveniently. The sensor layer may sense a user's touch or pressure. Meanwhile, demand for the use of a pen for a more precise touch input for users familiar with inputting information using a writing instrument or for a specific application program (e.g., an application program for sketching or drawing) is increasing.

The above information disclosed in this Background section is for enhancement of understanding of the background of the present disclosure, and therefore, it may contain information that does not constitute prior art.

SUMMARY

Embodiments of the present disclosure may be directed to an electronic device having improved visibility, for example, in that visibility of a pattern due to external light reflection may be reduced.

According to one or more embodiments of the present disclosure, an electronic device includes: a first electrode including a plurality of first patterns, and a first bridge pattern electrically connected to the plurality of first patterns; a second electrode crossing the first electrode; a third electrode overlapping with at least a portion of the first electrode; and a fourth electrode crossing the third electrode, and including a plurality of second patterns, and a second bridge pattern electrically connected to the plurality of second patterns. The first bridge pattern, the third electrode, and the plurality of second patterns are included in a first conductive layer. The plurality of first patterns, the second electrode, and the second bridge pattern are included in a second conductive layer on the first conductive layer. Each of the plurality of first patterns, the second electrode, and the second bridge pattern includes a plurality of first mesh lines, and at least some of a plurality of first end portions of the plurality of first mesh lines have a curvature.

In an embodiment, each of the first bridge pattern, the third electrode, and the plurality of second patterns may include a plurality of second mesh lines.

In an embodiment, at least some of a plurality of second end portions of the plurality of second mesh lines may have a straight-line shape.

In an embodiment, the plurality of second end portions may be covered by the plurality of first mesh lines.

In an embodiment, a portion of the plurality of second mesh lines may overlap with a gap between two first end portions facing each other from among the plurality of first end portions.

In an embodiment, an edge of the portion of the plurality of second mesh lines may have a curvature.

In an embodiment, the plurality of first end portions may include a first end portion having the curvature, and a second end portion having a straight-line shape.

In an embodiment, the plurality of second mesh lines may include a first lower mesh line and a second lower mesh line. The first lower mesh line may protrude and extend from the first end portion. The second lower mesh line may include a lower end portion having a straight-line shape, the second lower mesh line may not overlap with the second end portion, and the lower end portion may be spaced from the second end portion.

In an embodiment, the plurality of first mesh lines may include a plurality of bridge mesh lines included in the second bridge pattern, and an end portion of each of the plurality of bridge mesh lines may have a curvature.

In an embodiment, the plurality of first mesh lines may include a plurality of pattern mesh lines included in the plurality of first patterns and the second electrode, and an end portion of each of the plurality of pattern mesh lines may have a curvature.

In an embodiment, the plurality of first mesh lines may include a plurality of pattern mesh lines included in the plurality of first patterns and the second electrode. From among end portions of the plurality of pattern mesh lines, end portions facing end portions of the plurality of bridge mesh lines may have a curvature, and other remaining end portions may have a straight-line shape.

In an embodiment, the plurality of first mesh lines may include a plurality of bridge mesh lines included in the second bridge pattern. End portions of the plurality of bridge mesh lines may include a first end portion and a second end portion. The first end portion may have a curvature, and the second end portion may have a straight-line shape.

In an embodiment, the first end portion may overlap with one second mesh line included in the plurality of second mesh lines, and the second end portion may not overlap with the plurality of second mesh lines.

In an embodiment, the plurality of first mesh lines may include a plurality of pattern mesh lines included in the plurality of first patterns and the second electrode. The plurality of pattern mesh lines may include a first pattern mesh line extending in a first direction, and a second pattern mesh line extending in the first direction. The first pattern mesh line and the second pattern mesh line may be spaced from each other in a second direction crossing the first direction, and the first pattern mesh line may include a first pattern portion and a second pattern portion spaced from each other with a gap therebetween.

In an embodiment, the second pattern mesh line may include a third pattern portion, a compensation portion, and a fourth pattern portion spaced from the third pattern portion with the compensation portion therebetween. The compensation portion may face the gap in the second direction, and an edge of the compensation portion may have a curvature.

In an embodiment, a width of the compensation portion may be greater than a width of the third pattern portion.

In an embodiment, an end portion of the first pattern portion and an end portion of the second pattern portion facing each other may have a curvature.

According to one or more embodiments of the present disclosure, an electronic device includes: a display layer; a first conductive layer on the display layer, and including a plurality of lower mesh lines; and a second conductive layer on the first conductive layer, and including a plurality of upper mesh lines. At least some of a plurality of first end portions of the plurality of upper mesh lines have a curvature. A plurality of second end portions of the plurality of lower mesh lines are covered by the plurality of upper mesh lines, and a portion of the plurality of lower mesh lines overlaps with a gap between two first end portions facing each other from among the plurality of first end portions.

In an embodiment, at least some of the plurality of second end portions may have a straight-line shape.

In an embodiment, the plurality of first end portions may include a first end portion having the curvature, and a second end portion having a straight-line shape. The plurality of lower mesh lines may include a first lower mesh line and a second lower mesh line. The first lower mesh line may protrude and extend from the first end portion. The second lower mesh line may include a lower end portion having a straight-line shape, the second lower mesh line may not overlap with the second end portion, and the lower end portion may be spaced from the second end portion.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1A:
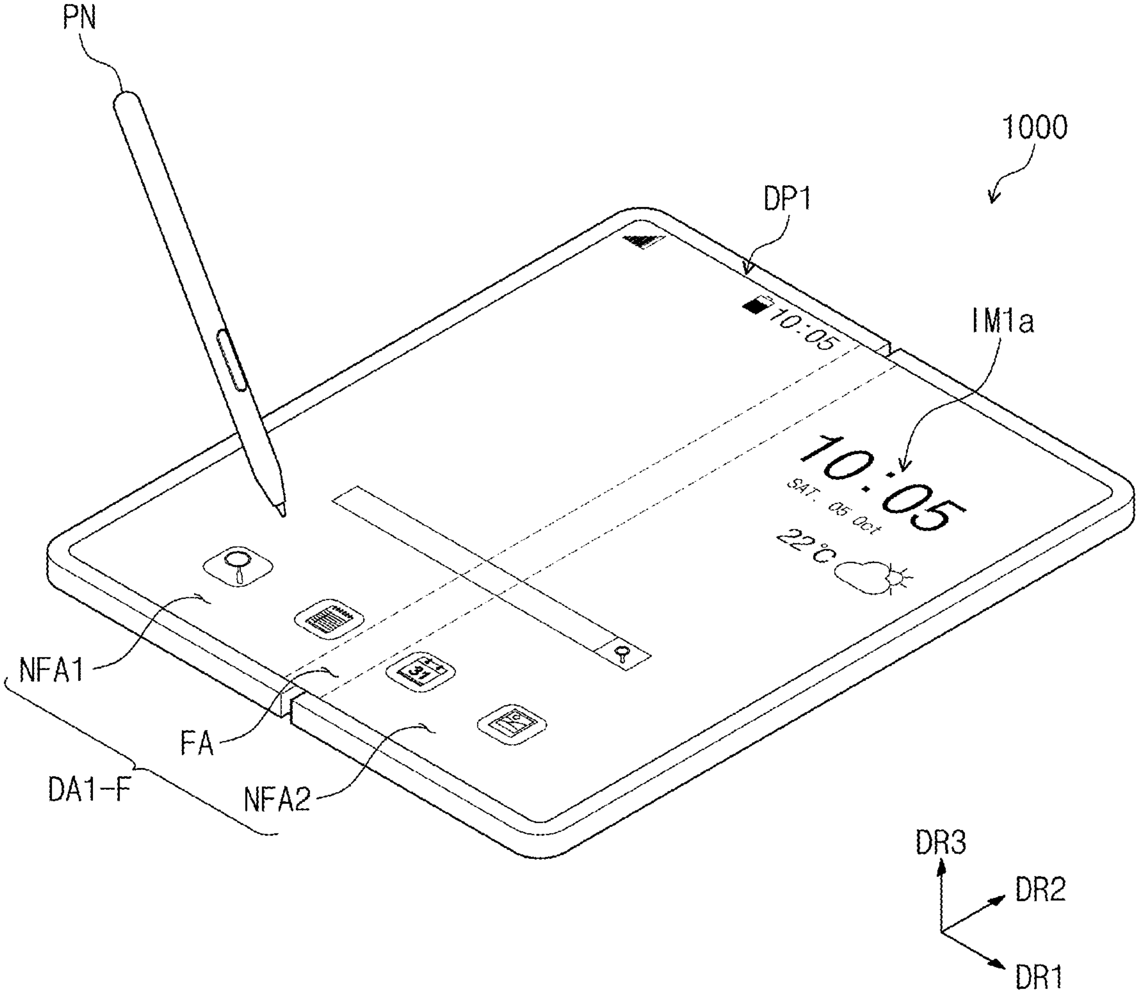
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The terms "part" and "unit" as used herein may refer to a software component or a hardware component for performing a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and task components, and may include processes, functions, attributes, procedures, subroutines, program code segments, drivers, firmware, microcode, circuits, data, database, data structures, tables, arrays, and/or variables.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
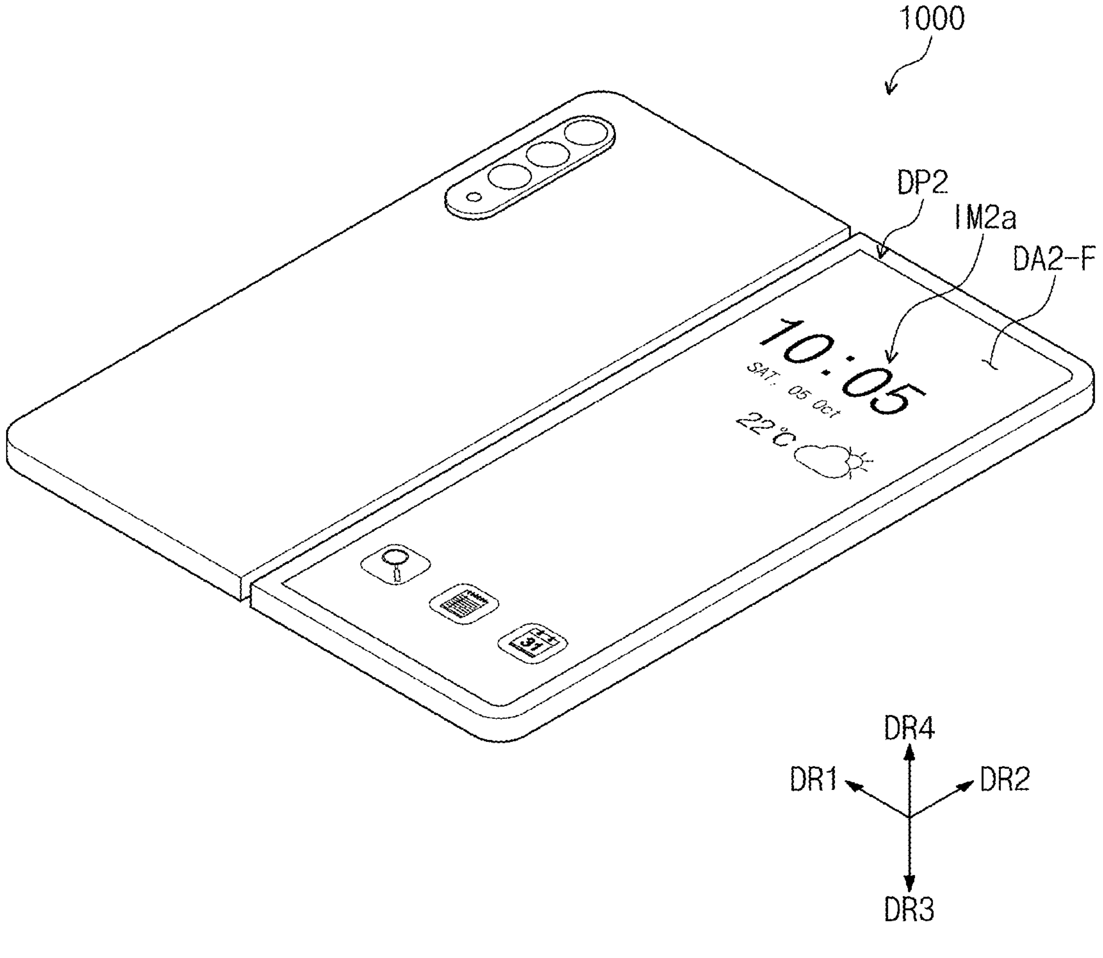
FIG. 1B is a rear perspective view of an electronic device according to an embodiment of the present disclosure.

FIG. 1A is a perspective view of an electronic device 1000 according to an embodiment of the present disclosure. FIG. 1B is a rear perspective view of the electronic device 1000 according to an embodiment of the present disclosure.

Referring to FIGS. 1A and 1B, the electronic device 1000 may be activated in response to an electrical signal. For example, the electronic device 1000 may display an image, and may sense external inputs applied from the outside. An external input may be a user's input. The user's input may include external inputs in various suitable forms, such as a part of a user's body, a pen PN, light, heat, or pressure.

The electronic device 1000 may include a first display panel DP1 and a second display panel DP2. The first display panel DP1 and the second display panel DP2 may be separate panels separated from each other. The first display panel DP1 may be referred to as a main display panel, and the second display panel DP2 may be referred to as an auxiliary display panel or an external display panel.

The first display panel DP1 may include a first display portion DA1-F, and the second display panel DP2 may include a second display portion DA2-F. An area size of the second display panel DP2 may be smaller than an area size of the first display panel DP1. In correspondence with the sizes of the first display panel DP1 and the second display panel DP2, an area size of the first display portion DA1-F may be greater than an area size of the second display portion DA2-F.

In an unfolded state of the electronic device 1000, the first display portion DA1-F may have a plane parallel to or substantially parallel to a first direction DR1 and a second direction DR2. A thickness direction of the electronic device 1000 may be parallel to or substantially parallel to a third direction DR3 crossing the first direction DR1 and the second direction DR2. Thus, a front surface (e.g., an upper surface) and a rear surface (e.g., a lower surface) of the members constituting the electronic device 1000 may be defined on the basis of the third direction DR3.

The first display panel DP1 or the first display portion DA1-F may include a folding region FA that may be folded and unfolded, and a plurality of non-folding regions NFA1 and NFA2 spaced apart from each other with the folding region FA therebetween. The second display panel DP2 may overlap with any one of the plurality of non-folding regions NFA1 and NFA2. For example, the second display panel DP2 may overlap with a first non-folding region NFA1.

A display direction of a first image IM1*a* displayed in a portion of the first display panel DP1, for example, such as in the first non-folding region NFA1, and a display direction of a second image IM2*a* displayed in the second display panel DP2 may be opposite to each other. For example, the first image IM1*a* may be displayed in the third direction DR3, and the second image IM2*a* may be displayed in a fourth direction DR4, which is an opposite direction of the third direction DR3.

In an embodiment of the present disclosure, the folding region FA may be bent with respect to a folding axis extending along a direction parallel to or substantially parallel to a long side of the electronic device 1000, for example, such as along a direction parallel to or substantially parallel to the second direction DR2. In a folded state of the electronic device 1000, the folding region FA may have a suitable curvature (e.g., a predetermined curvature) and a radius of curvature. The electronic device 1000 may be inner-folded so that the first non-folding region NFA1 and a second non-folding region NFA2 face each other, and the first display portion DA1-F is not exposed to the outside.

In an embodiment of the present disclosure, the electronic device 1000 may be outer-folded so that the first display portion DA1-F is exposed to the outside. In an embodiment of the present disclosure, the electronic device 1000 may be capable of being both inner-folded or outer-folded from an unfolded state, but the present disclosure is not limited thereto.

FIG. 1A illustrates that one folding region FA is defined (e.g., is provided or included) in the electronic device 1000 as an example, but the present disclosure is not limited thereto. For example, a plurality of folding axes and a plurality of folding regions corresponding to the folding axes may be defined in the electronic device 1000, and the electronic device 1000 may be inner-folded or outer-folded from an unfolded state at each of the plurality of folding regions.

According to an embodiment of the present disclosure, at least one of the first display panel DP1 or the second display panel DP2 may sense an input by the pen PN even if a digitizer is not included. Thus, because a digitizer for sensing the pen PN may be omitted, an increase in a thickness, an increase in a weight, and a deterioration in a flexibility of the electronic device 100 due to the addition of a digitizer may not occur. Thus, the second display panel DP2, as well as the first display panel DP1, may be designed to be capable of sensing the pen PN.

Figure 2:
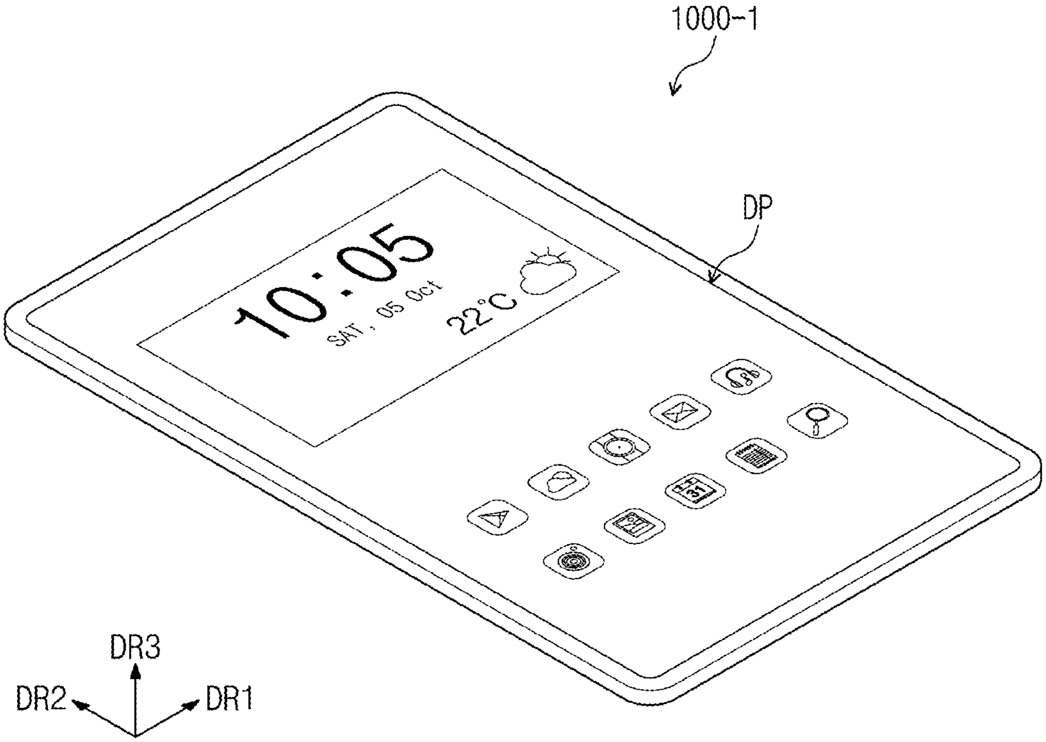
FIG. 2 is a perspective view of an electronic device according to an embodiment of the present disclosure.
Figure 3:
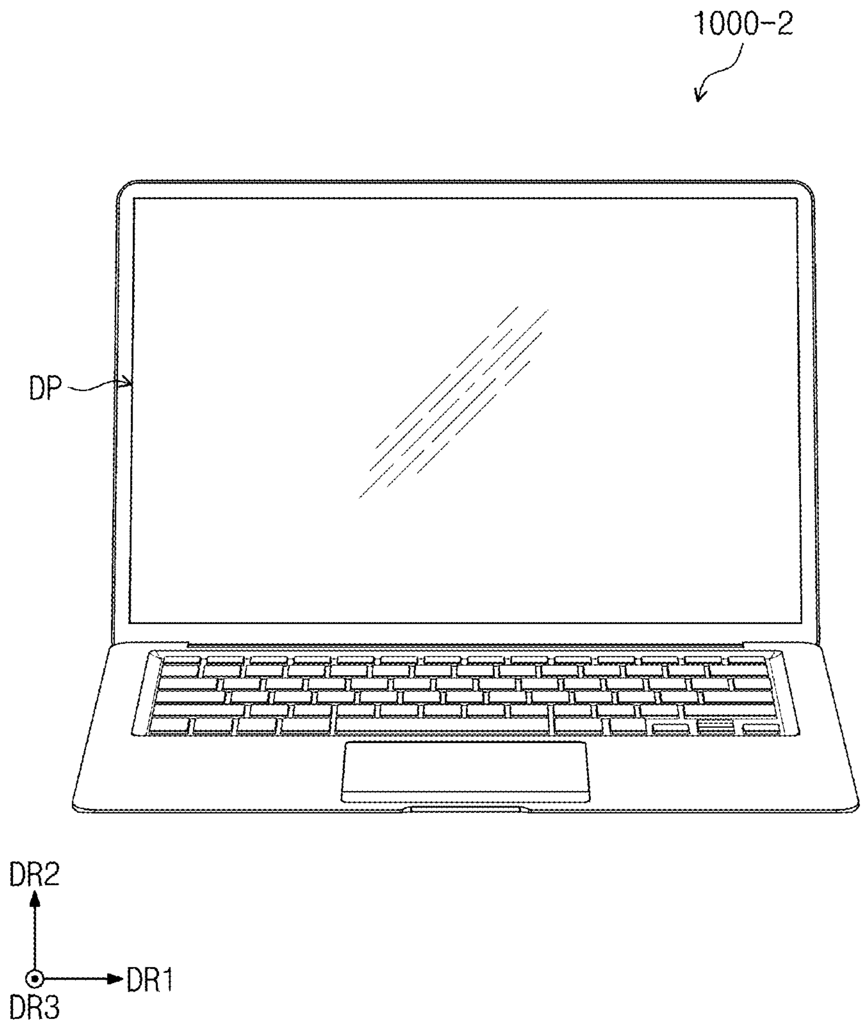
FIG. 3 is a perspective view of an electronic device according to an embodiment of the present disclosure.

FIG. 2 is a perspective view of an electronic device 1000-1 according to an embodiment of the present disclosure. FIG. 3 is a perspective view of an electronic device 1000-2 according to an embodiment of the present disclosure.

FIG. 2 illustrates that the electronic device 1000-1 is a mobile phone, and the electronic device 1000-1 may include a display panel DP. FIG. 3 illustrates that the electronic device 1000-2 is a laptop, and the electronic device 1000-2 may include a display panel DP. Although FIG. 3 is a perspective view of the electronic device 1000-2, the coordinate axes illustrated in FIG. 3 are shown based on the display panel DP within the electronic device 1000-2.

In an embodiment of the present disclosure, the display panel DP may sense external inputs applied from the outside. An external input may be a user's input. The user's input may include external inputs in various suitable forms, such as a part of a user's body, the pen PN (e.g., see FIG. 1A), light, heat, or pressure.

According to an embodiment of the present disclosure, the display panel DP may sense an input by the pen PN even if a digitizer is not included. Thus, because a digitizer for sensing the pen PN may be omitted, an increase in a thickness and an increase in a weight of the electronic device 1000-1 or 1000-2 due to the addition of a digitizer may not occur.

FIG. 1A illustrates the foldable-type electronic device 1000, and FIG. 2 illustrates a bar-type electronic device 1000-1, but the present disclosure is not limited thereto. For example, the embodiments described hereinafter may be applied to various suitable electronic devices, such as a rollable-type electronic device, a slidable-type electronic device, and a stretchable-type electronic device.

Figure 4:
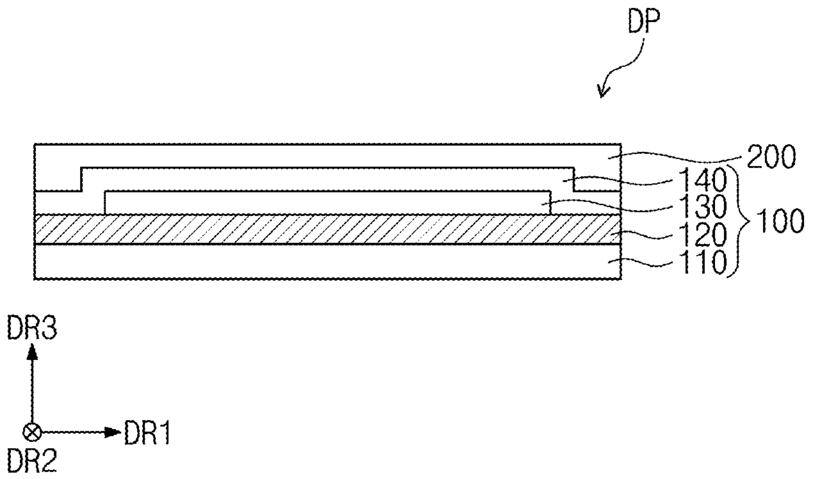
FIG. 4 is a schematic cross-sectional view of a display panel according to an embodiment of the present disclosure.

FIG. 4 is a schematic cross-sectional view of a display panel DP according to an embodiment of the present disclosure.

Referring to FIG. 4, the display panel DP may include a display layer 100 and a sensor layer 200.

The display layer 100 may be a component that generates or substantially generates an image. The display layer 100 may be an emissive display layer. For example, the display layer 100 may be an organic light-emitting display layer, an inorganic light-emitting display layer, an organic-inorganic light-emitting display layer, a quantum dot display layer, a micro-LED display layer, or a nano-LED display layer. The display layer 100 may include a base layer 110, a circuit layer 120, a light-emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, a polymer substrate, or the like, but the present disclosure is not particularly limited thereto.

The circuit layer 120 may be disposed on the base layer 110. The circuit layer 120 may include an insulating layer, a semiconductor pattern, a conductive pattern, a signal line, and the like. An insulating layer, a semiconductor layer, and a conductive layer may be formed on the base layer 110 through coating, deposition, or the like, and the insulating layer, the semiconductor layer, and the conductive layer may be selectively patterned through a photolithography process performed multiple times.

The light-emitting element layer 130 may be disposed on the circuit layer 120. The light-emitting element layer 130 may include a light-emitting element. For example, the light-emitting element layer 130 may include an organic light-emitting material, an inorganic light-emitting material, an organic-inorganic light-emitting material, a quantum dot, a quantum rod, a micro-LED, or a nano-LED.

The encapsulation layer 140 may be disposed on the light-emitting element layer 130. The encapsulation layer 140 may protect the light-emitting element layer 130 from moisture, oxygen, and foreign substances, such as dust particles.

The sensor layer 200 may be disposed on the display layer 100. The sensor layer 200 may sense an external input applied from the outside. The sensor layer 200 may be an integrated sensor that is continuously formed in a manufacturing process for the display layer 100, or an external sensor that is attached to the display layer 100. The sensor layer 200 may be referred to as a sensor, an input sensing layer, an input sensing panel, an electronic device for sensing an input coordinate, or the like.

According to an embodiment of the present disclosure, the sensor layer 200 may sense both an input from a passive-type input means, such as a user's body, and an input from an input device that generates a magnetic field having a suitable resonant frequency (e.g., a predetermined resonant frequency). The input device may be referred to as a pen, an input pen, a magnetic pen, a stylus pen, or an electromagnetic resonant pen.

Figure 5:
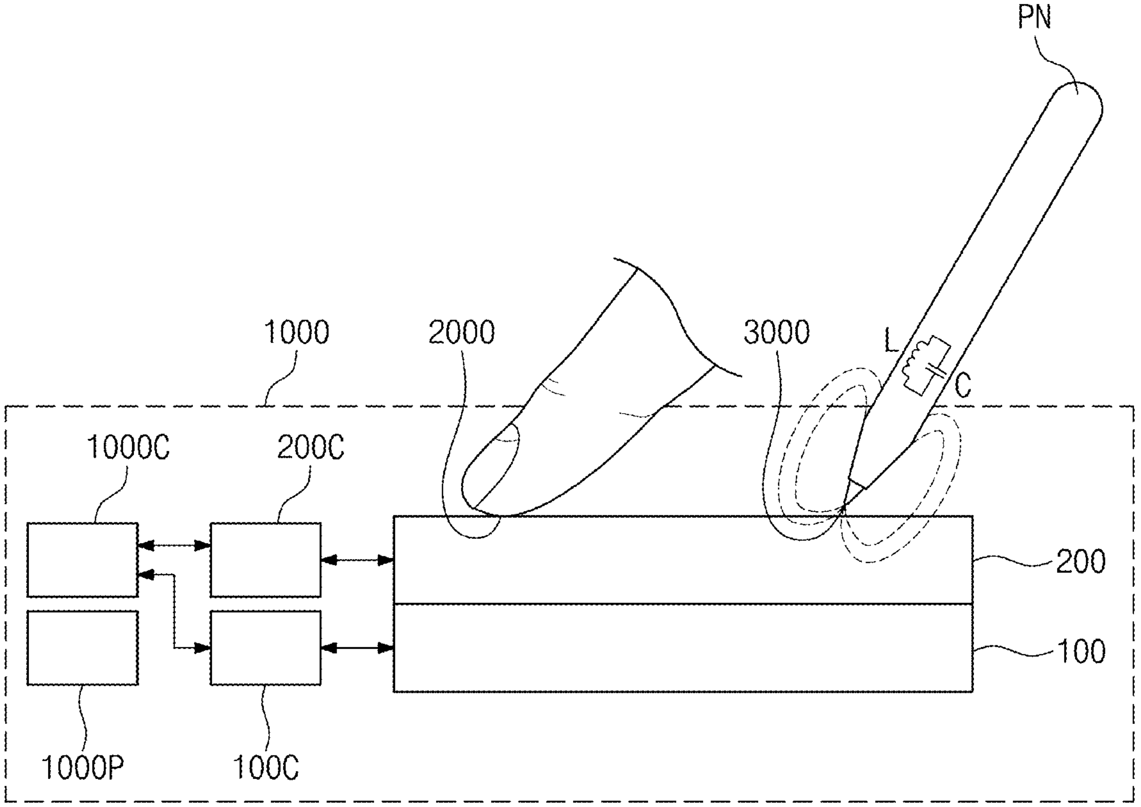
FIG. 5 is a diagram illustrating an operation of an electronic device according to an embodiment of the present disclosure.

FIG. 5 is a diagram illustrating an operation of an electronic device 1000 according to an embodiment of the present disclosure.

Referring to FIG. 5, the electronic device 1000 may include a display layer 100, a sensor layer 200, a display driver 100C, a sensor driver 200C, a main driver 1000C, and a power circuit 1000P.

The sensor layer 200 may sense a first input 2000 or a second input 3000 applied from the outside. Each of the first input 2000 and the second input 3000 may be from an input means capable of providing a change in a capacitance of the sensor layer 200, or an input means capable of causing an induced current in the sensor layer 200. For example, the first input 2000 may be from a passive-type input means, such as a user's body. The second input 3000 may be an input by a pen PN, or an input by an RFIC tag. For example, the pen PN may be a passive-type pen or an active-type pen.

In an embodiment of the present disclosure, the pen PN may be a device that generates a magnetic field having a suitable resonant frequency (e.g., a predetermined resonant frequency). The pen PN may transmit an output signal based on an electromagnetic resonant method. The pen PN may be referred to as an input device, an input pen, a magnetic pen, a stylus pen, or an electromagnetic resonant pen.

The pen PN may include an RLC resonant circuit, and the RLC resonant circuit may include an inductor L and a capacitor C. In an embodiment of the present disclosure, the RLC resonant circuit may be a variable resonant circuit that varies a resonant frequency. In this case, the inductor L may be a variable inductor and/or the capacitor C may be a variable capacitor, but the present disclosure is not particularly limited thereto.

The inductor L generates a current due to a magnetic field that is formed in the electronic device 1000, for example, such as in the sensor layer 200. However, the present disclosure is not limited thereto. For example, in a case in which the pen PN operates as an active-type, the pen PN may generate a current even if the pen PN is not provided with a magnetic field from the outside. The generated current is transmitted to the capacitor C. The capacitor C is charged with a current input from the inductor L, and discharges the charged current to the inductor L. Then, the inductor L may emit a magnetic field having a resonant frequency. Induced current may flow in the sensor layer 200 due to a magnetic field emitted by the pen PN, and the induced current may be transmitted to the sensor driver 200C as a reception signal (e.g., a sensing signal or a signal).

The main driver 1000C may control the overall operation of the electronic device 1000. For example, the main driver 1000C may control an operation of the display driver 100C and the sensor driver 200C. The main driver 1000C may include at least one microprocessor, and may further include a graphics controller. The main driver 1000C may be referred to as an application processor, a central processing unit, or a main processor.

The display driver 100C may drive the display layer 100. The display driver 100C may receive image data and a control signal from the main driver 1000C. The control signal may include various suitable signals. For example, the control signal may include an input vertical synchronization signal, an input horizontal synchronization signal, a main clock signal, a data enable signal, and the like.

The sensor driver 200C may drive the sensor layer 200. The sensor driver 200C may receive a control signal from the main driver 1000C. The control signal may include a clock signal of the sensor driver 200C. In addition, the control signal may further include a mode determination signal to determine a driving mode of the sensor driver 200C and the sensor layer 200.

The sensor driver 200C may be embodied as an integrated circuit (IC), and may be electrically connected to the sensor layer 200. For example, the sensor driver 200C may be directly mounted in a region (e.g., a predetermined region) of the display panel, or may be mounted on a separate printed circuit board using a chip-on-film (COF) method and electrically connected to the sensor layer 200.

The sensor driver 200C and the sensor layer 200 may selectively operate in a first mode or a second mode. For example, the first mode may be a mode for sensing a touch input, for example, such as the first input 2000. The second mode may be a mode for sensing an input by the pen PN, for example, such as the second input 3000. The first mode may be referred to as a touch sensing mode, and the second mode may be referred to as a pen sensing mode.

Switching between the first mode and the second mode may be performed in various ways. For example, the sensor driver 200C and the sensor layer 200 may be driven in the first mode and the second mode in a time-division manner, and may sense the first input 2000 and the second input 3000. As another example, switching between the first mode and the second mode may be caused by a user's selection or a user's specific action (e.g., input), or any one of the first mode or the second mode may be activated or deactivated, or may be switched to the other by activation or deactivation of a specific application. As another example, while the sensor driver 200C and the sensor layer 200 are operating alternately in the first mode and the second mode, when the first input 2000 is sensed, the first mode may be maintained, or when the second input 3000 is sensed, the second mode may be maintained.

The sensor driver 200C may calculate coordinate information of an input on the basis of a signal received from the sensor layer 200, and may provide a coordinate signal having coordinate information to the main driver 1000C. The main driver 1000C executes an operation corresponding to a user's input on the basis of the coordinate signal. For example, the main driver 1000C may operate the display driver 100C so that a new application image is displayed in the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high voltage, a gate low voltage, a first driving voltage (e.g., ELVSS voltage), a second driving voltage (e.g., ELVDD voltage), an initialization voltage, and/or the like, but the present disclosure is not particularly limited thereto.

Figure 6A:
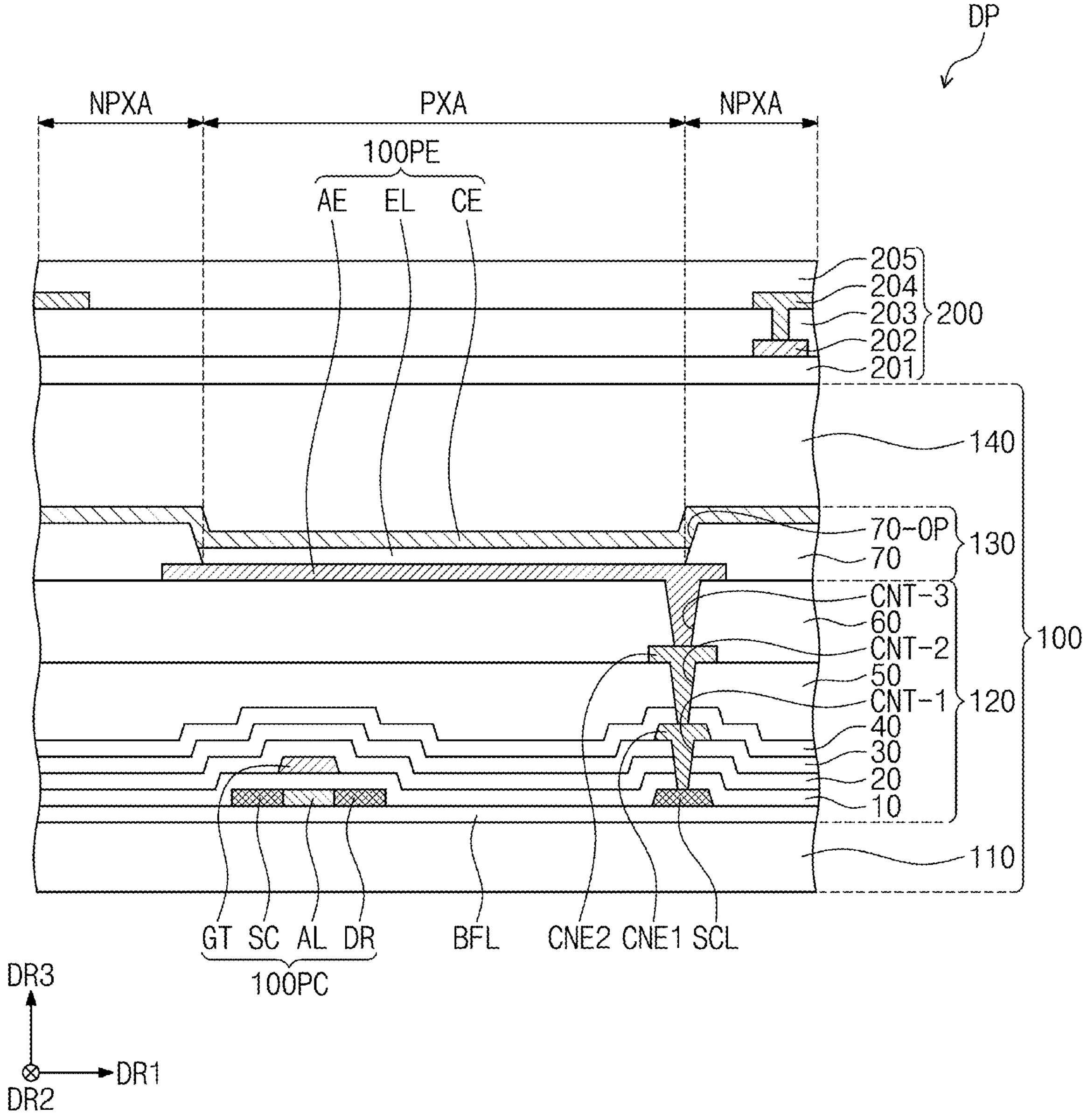
FIG. 6A is a cross-sectional view of a display panel according to an embodiment of the present disclosure.

FIG. 6A is a cross-sectional view of a display panel DP according to an embodiment of the present disclosure.

Referring to FIG. 6A, at least one buffer layer BFL is formed on an upper surface of a base layer 110. The buffer layer BFL may improve a bonding force between the base layer 110 and a semiconductor pattern. The buffer layer BFL may be formed of multiple layers. As another example, a display layer 100 may further include a barrier layer. The buffer layer BFL may include at least one of silicon oxide, silicon nitride, or silicon oxynitride. For example, the buffer layer BFL may include a structure in which a silicon oxide layer and a silicon nitride layer are alternately stacked.

A semiconductor pattern SC, AL, DR, and SCL may be disposed on the buffer layer BFL. The semiconductor pattern SC, AL, DR, and SCL may include poly silicon. However, the present disclosure is not limited thereto, and the semiconductor pattern SC, AL, DR, and SCL may include amorphous silicon, a low-temperature polycrystalline silicon, or an oxide semiconductor.

FIG. 6A illustrates a partial semiconductor pattern SC, AL, DR, and SCL, and other semiconductor patterns may be further disposed in another region in another view. The semiconductor pattern SC, AL, DR, and SCL may be arranged according to a suitable rule (e.g., a specific or predetermined rule) across the pixels. The semiconductor pattern SC, AL, DR, and SCL may have a different electrical property according to whether the semiconductor pattern is doped or not. The semiconductor pattern SC, AL, DR, and SCL may include a first region SC, DR, and SCL having a higher conductivity, and a second region AL having a lower conductivity. The first region SC, DR, and SCL may be doped with an N-type dopant or a P-type dopant. A P-type transistor may include a doped region that is doped with a P-type dopant, and an N-type transistor may include a doped region that is doped with an N-type dopant. The second region AL may be an undoped region or a region that is doped at a lower concentration compared to that of the first region SC, DR, and SCL.

The first region SC, DR, and SCL may have a higher conductivity than the second region AL, and may serve or substantially serve as an electrode or a signal line. The second region AL may correspond to or substantially correspond to an active region AL (e.g., a channel) of a transistor 100PC. In other words, a portion AL of the semiconductor pattern SC, AL, DR, and SCL may be the active region AL of the transistor 100PC, another portion SC and DR may be a source region SC or a drain region DR of the transistor 100PC, and another portion SCL may be a connection electrode or a connection signal line SCL.

Each of the pixels may have an equivalent circuit including a plurality of transistors, at least one capacitor, and at least one light-emitting element, but the present disclosure is not limited thereto, and the equivalent circuit of a pixel may be variously modified as needed or desired. FIG. 6A illustrates one transistor 100PC and one light-emitting element 100PE included in a pixel as a representative example.

The source region SC, the active region AL, and the drain region DR of the transistor 100PC may be formed from the semiconductor pattern SC, AL, DR, and SCL. The source region SC and the drain region DR may extend in opposite directions as each other from the active region AL in a cross-sectional view. FIG. 6A illustrates a portion of the connection signal line SCL formed from the semiconductor pattern SC, AL, DR, and SCL. In another view (e.g., in a plan view), the connection signal line SCL may be connected to the drain region DR of the transistor 100PC.

A first insulating layer 10 may be disposed on the buffer layer BFL. The first insulating layer 10 may overlap with a plurality of pixels in common, and may cover the semiconductor pattern SC, AL, DR, and SCL. The first insulating layer 10 may be an inorganic layer and/or an organic layer, and may have a single-layer or multi-layered structure. The first insulating layer 10 may include at least one of aluminum oxide, titanium oxide, silicon oxide, silicon nitride, silicon oxynitride, zirconium oxide, or hafnium oxide. In the present embodiment, the first insulating layer 10 may be a single-layer silicon oxide layer. Not only the first insulating layer 10, but also an insulating layer of a circuit layer 120 to be described in more detail below, may be an inorganic layer and/or an organic layer, and may have a single-layer or multi-layered structure. The inorganic layer may include at least one of the inorganic materials described above, but the present disclosure is not limited thereto.

A gate GT of the transistor 100PC is disposed on the first insulating layer 10. The gate GT may be a portion of a metal pattern. The gate GT overlaps with the active region AL. The gate GT may function as a mask in a process of doping or reducing the semiconductor pattern SC, AL, DR, and SCL.

A second insulating layer 20 may be disposed on the first insulating layer 10, and may cover the gate GT. The second insulating layer 20 may overlap with the pixels in common. The second insulating layer 20 may be an inorganic layer and/or an organic layer, and may have a single-layer or multi-layered structure. The second insulating layer 20 may include at least one of silicon oxide, silicon nitride, or silicon oxynitride. In the present embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer or multi-layered structure. For example, the third insulating layer 30 may have a multi-layered structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single-layer silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50, and may cover the second connection electrode CNE2. The sixth insulating layer 60 may be an organic layer.

A light-emitting element layer 130 may be disposed on the circuit layer 120. The light-emitting element layer 130 may include the light-emitting element 100PE. For example, the light-emitting element layer 130 may include an organic light-emitting material, an inorganic light-emitting material, an organic-inorganic light-emitting material, a quantum dot, a quantum rod, a micro-LED, or a nano-LED. Hereinafter, the light-emitting element 100PE will be described in more detail in the context of an organic light-emitting element as a representative example, but the present disclosure is not particularly limited thereto.

The light-emitting element 100PE may include a first electrode AE, an emission layer EL, and a second electrode CE.

The first electrode AE may be disposed on the sixth insulating layer 60. The first electrode AE may be connected to the second connection electrode CNE2 through a contact hole CNT-3 penetrating the sixth insulating layer 60.

A pixel-defining film 70 may be disposed on the sixth insulating layer 60, and may cover a portion of the first electrode AE. An opening 70-OP is defined in the pixel-defining film 70. The opening 70-OP of the pixel-defining film 70 exposes at least a portion of the first electrode AE.

The first display portion DA1-F (e.g., see FIG. 1A) may include a light-emitting region PXA, and a non-light-emitting region NPXA adjacent to the light-emitting region PXA. The non-light-emitting region NPXA may surround (e.g., around a periphery of) the light-emitting region PXA. In the present embodiment, the light-emitting region PXA is defined to correspond to a partial region of the first electrode AE exposed by the opening 70-OP.

The emission layer EL may be disposed on the first electrode AE. The emission layer EL may be disposed in a region corresponding to the opening 70-OP. FIG. 6A illustrates that the emission layer EL is disposed in the opening 70-OP as an example, but the present disclosure is not limited thereto. For example, the emission layer EL may extend to cover a portion of an upper surface of the pixel-defining film 70 and a side surface of the pixel-defining film 70, which defines the opening 70-OP.

In an embodiment of the present disclosure, the emission layer EL may be separately formed in each of the pixels. In a case in which the emission layer EL is separately formed in each of the pixels, each emission layer EL may emit light of at least one of blue, red, or green. However, the present disclosure is not limited thereto, and the emission layer EL may have an integrated form to be included in a plurality of pixels in common. In this case, the emission layer EL may provide blue light or white light.

The second electrode CE may be disposed on the emission layer EL. The second electrode CE may have an integrated form, and may be included in the plurality of pixels in common.

In an embodiment of the present disclosure, a hole control layer may be disposed between the first electrode AE and the emission layer EL. The hole control layer may be disposed in the light-emitting region PXA and the non-light-emitting region NPXA in common. The hole control layer may include a hole transport layer, and may further include a hole injection layer. An electron control layer may be disposed between the emission layer EL and the second electrode CE. The electron control layer may include an electron transport layer, and may further include an electron injection layer. The hole control layer and the electron control layer may be formed in the plurality of pixels in common by using an open mask or an inkjet process.

An encapsulation layer 140 may be disposed on the light-emitting element layer 130. The encapsulation layer 140 may include an inorganic layer, an organic layer, and an inorganic layer, which are sequentially stacked, but the layers constituting the encapsulation layer 140 are not limited thereto. The inorganic layers may protect the light-emitting element layer 130 from moisture and oxygen, and the organic layer may protect the light-emitting element layer 130 from foreign substances, such as dust particles. The inorganic layers may include a silicon nitride layer, a silicon oxynitride layer, a silicon oxide layer, a titanium oxide layer, an aluminum oxide layer, or the like. The organic layer may include an acrylic organic layer, but the present disclosure is not limited thereto.

A sensor layer 200 may include a base layer 201, a first conductive layer 202, an intermediate insulating layer 203, a second conductive layer 204, and a cover insulating layer 205.

The base layer 201 may be an inorganic layer including at least any one of silicon nitride, silicon oxynitride, or silicon oxide. As another example, the base layer 201 may be an organic layer including an epoxy resin, an acryl resin, or an imide-based resin. The base layer 201 may have a single-layer structure, or a multi-layered structure in which a plurality of layers are stacked along a third direction DR3. In an embodiment of the present disclosure, the sensor layer 200 may not include the base layer 201.

The first conductive layer 202 and the second conductive layer 204 may each have a single-layer structure, or a multi-layered structure in which a plurality of layers are stacked along the third direction DR3.

Each of the first conductive layer 202 and the second conductive layer 204 having the single-layer structure may include a metal layer or a transparent conductive layer. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), or indium zinc tin oxide (IZTO). In addition, the transparent conductive layer may include a conductive polymer, such as poly(3,4-ethylenedioxythiophene) (PEDOT), a metal nanowire, graphene, or the like.

Each of the first conductive layer 202 and the second conductive 204 having the multi-layered structure may include a plurality of metal layers. For example, the metal layers may have a triple-layered structure of titanium/aluminum/titanium. The conductive layer having the multi-layered structure may include at least one metal layer and at least one transparent conductive layer.

In an embodiment of the present disclosure, a thickness of the first conductive layer 202 may be equal to or greater than a thickness of the second conductive layer 204. In a case in which the thickness of the first conductive layer 202 is greater than the thickness of the second conductive layer 204, a resistance of a component (e.g., an electrode, a pattern, a bridge pattern, or the like) included in the first conductive layer 202 may be reduced. In addition, even if the thickness of the first conductive layer 202 is increased, the components included in the first conductive layer 202 may be less likely to be viewed due to external light reflection than those of the second conductive layer 204, because the first conductive layer 202 may be disposed to be lower than (e.g., under) the second conductive layer 204.

At least one of the intermediate insulating layer 203 or the cover insulating layer 205 may include an inorganic film. The inorganic film may include at least one of aluminum oxide, titanium oxide, silicon oxide, silicon nitride, silicon oxynitride, zirconium oxide, or hafnium oxide.

At least one of the intermediate insulating layer 203 or the cover insulating layer 205 may include an organic film. The organic film may include at least any one of an acrylic resin, a methacrylic resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

The sensor layer 200 is illustrated in FIG. 6A as including the first conductive layer 202 and the second conductive layer 204, or in other words, a total of two conductive layers as an example, but the present disclosure is not particularly limited thereto. For example, the sensor layer 200 may include three or more conductive layers.

Figure 6B:
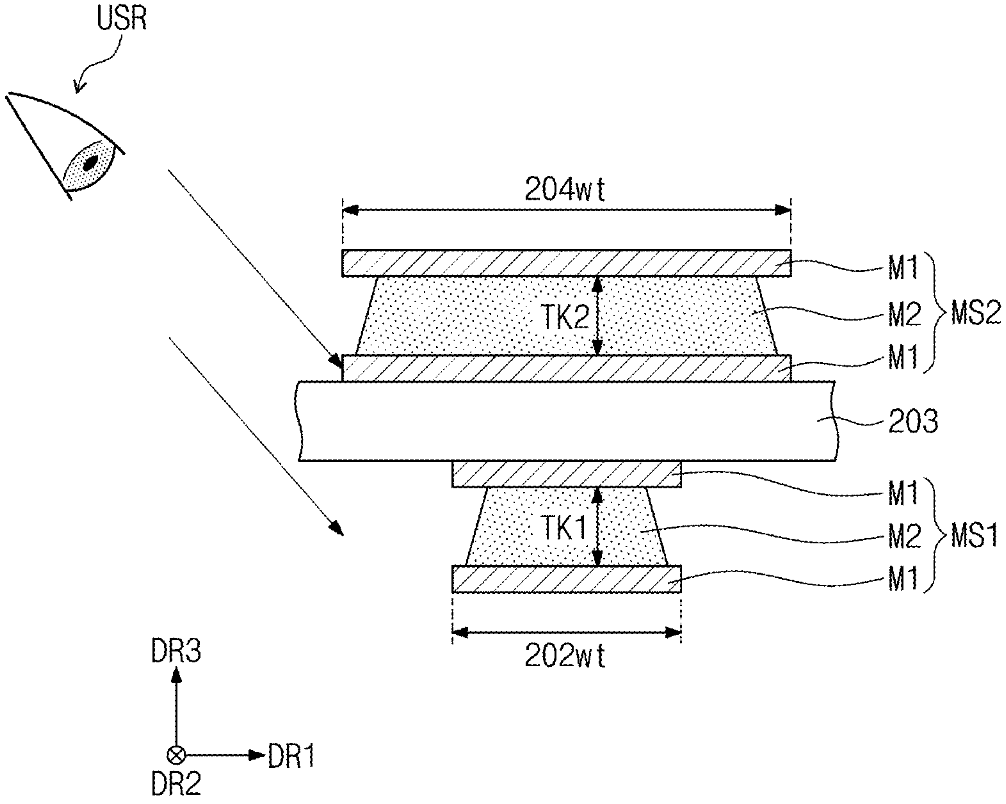
FIG. 6B is a cross-sectional view illustrating some components of a sensor layer according to an embodiment of the present disclosure.

FIG. 6B is a cross-sectional view illustrating some components of the sensor layer 200 according to an embodiment of the present disclosure.

Referring to FIGS. 6A and 6B, a second width 204*wt* of a second mesh line MS2 included in the second conductive layer 204 may be equal to or greater than a first width 202*wt* of a first mesh line MS1 included in the first conductive layer 202. When a user USR views the first mesh line MS1 and the second mesh line MS2 from the side, the first mesh line MS1 may be less likely to be viewed by the user USR, because the first mesh line MS1 has a smaller width than that of the second mesh line MS2.

The first mesh line MS1 and the second mesh line MS2 may each include first metal layers M1, and a second metal layer M2 disposed between the first metal layers M1. For example, the first metal layers M1 may include titanium (Ti), and the second metal layer M2 may include aluminum (Al). However, the present disclosure is not limited thereto.

In an embodiment of the present disclosure, a first thickness TK1 of the second metal layer M2 of the first mesh line MS1 and a second thickness TK2 of the second metal layer M2 of the second mesh line MS2 may be the same or substantially the same as each other, but the present disclosure is not limited thereto. For example, the first thickness TK1 may be greater than the second thickness TK2. As another example, the second thickness TK2 may be greater than the first thickness TK1. In an embodiment of the present disclosure, each of the first thickness TK1 and the second thickness TK2 may be at least about 1000 angstroms, for example, such as about 6000 angstroms.

Figure 7:
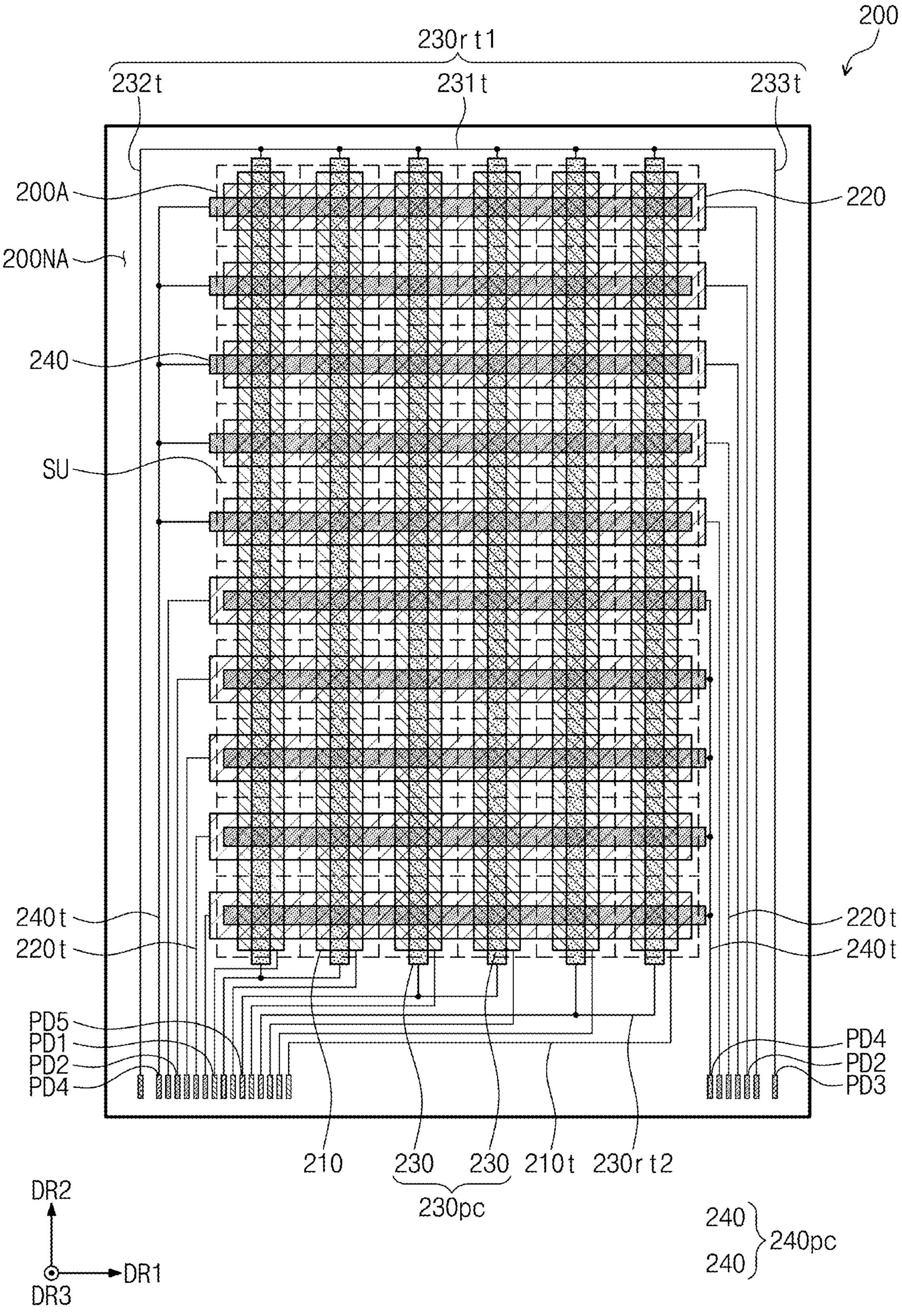
FIG. 7 is a plan view of a sensor layer according to an embodiment of the present disclosure.

FIG. 7 is a plan view of a sensor layer 200 according to an embodiment of the present disclosure.

Referring to FIG. 7, a sensing region 200A and a peripheral region 200NA adjacent to the sensing region 200A may be defined in the sensor layer 200.

The sensor layer 200 may include a plurality of first electrodes 210, a plurality of second electrodes 220, a plurality of third electrodes 230, and a plurality of fourth electrodes 240 disposed in the sensing region 200A.

The first electrodes 210 may each cross the second electrodes 220. The first electrodes 210 may each extend in a second direction DR2, and may be arranged to be spaced apart from each other along a first direction DR1. The second electrodes 220 may each extend in the first direction DR1, and may be arranged to be spaced apart from each other along the second direction DR2. A sensing unit (e.g., a sensing region) SU of the sensor layer 200 may be a region in which one first electrode 210 and one second electrode 220 cross each other.

FIG. 7 illustrates six first electrodes 210, ten second electrodes 220, and sixty sensing units SU as an example, but the number of first electrodes 210 and the number of second electrodes 220 are not limited thereto.

The third electrodes 230 may each extend in the second direction DR2, and may be arranged to be spaced apart from each other along the first direction DR1. One third electrode 230 may at least partially overlap with one first electrode 210. According to an embodiment of the present disclosure, a capacitance (e.g., a coupling capacitance) between one first electrode 210 and one third electrode 230 may be adjusted by adjusting an overlapping area size of the one first electrode 210 and the one third electrode 230.

In an embodiment of the present disclosure, at least some of the third electrodes 230 may be connected in parallel with each other. For example, FIG. 7 illustrates that two third electrodes 230 are connected in parallel with each other, and constitute a first electrode group 230*pc* as an example. In this case, three first electrode groups 230*pc* may be arranged along the first direction DR1. However, the number of third electrodes 230 constituting the first electrode group 230*pc* is not limited thereto. For example, one first electrode group 230*pc* may include only one third electrode 230, or may include three or more third electrodes 230.

As the number of third electrodes 230 included in the first electrode group 230*pc* and connected in parallel with each other increases, a resistance of the first electrode group 230*pc* may be reduced, and thus, a power efficiency and a sensing sensitivity may be improved. On the other hand, as the number of third electrodes 230 included in the first electrode group 230*pc* decreases, a loop coil pattern formed by using the first electrode group 230*pc* may be embodied in more various desired forms.

The fourth electrodes 240 may be arranged along the second direction DR2, and may extend in the first direction DR1. One fourth electrode 240 may at least partially overlap with one second electrode 220. According to an embodiment of the present disclosure, a capacitance (e.g., a coupling capacitance) between one second electrode 220 and one fourth electrode 240 may be adjusted by adjusting an overlapping area size of the one second electrode 220 and the one fourth electrode 240.

In an embodiment of the present disclosure, at least some of the fourth electrodes 240 may be electrically connected to each other, and may constitute one second electrode group 240*pc*. For example, FIG. 7 illustrates that five fourth electrodes 240 are connected to the same one trace line, for example, such as to a fourth trace line 240*t*, and constitute one second electrode group 240*pc*, as an example. Thus, FIG. 7 illustrates that two second electrode groups 240*pc* are arranged along the second direction DR2. However, the number of fourth electrodes 240 constituting one second electrode group 240*pc* is not limited thereto. For example, the number of fourth electrodes 240 constituting one second electrode group 240*pc* may be ten, and in this case, the sensor layer 200 may include only one second electrode group 240*pc*.

The sensor layer 200 may further include a plurality of first trace lines 210*t*, a plurality of first pads PD1 connected in a one-to-one correspondence to the first trace lines 210*t*, a plurality of second trace lines 220*t*, and a plurality of second pads PD2 connected in a one-to-one correspondence to the second trace lines 220*t*, which may be disposed in the peripheral region 200NA. The first trace lines 210*t* may be electrically connected in a one-to-one correspondence to the first electrodes 210. The second trace lines 220*t* may be electrically connected in a one-to-one correspondence to the second electrodes 220.

The sensor layer 200 may further include a third trace line 230*rt*1, a plurality of third pads PD3 connected to one end and another end of the third trace line 230*rt*1, fourth trace lines 240*t*, fourth pads PD4 connected in a one-to-one correspondence to the fourth trace lines 240*t*, fifth trace lines 230*rt*2, and fifth pads PD5 connected in a one-to-one correspondence to the fifth trace lines 230*rt*2, which are disposed in the peripheral region 200NA.

The third trace line 230*rt*1 may be electrically connected to the third electrodes 230. In an embodiment of the present disclosure, the third trace line 230*rt*1 may be electrically connected to all of the third electrodes 230. The third trace line 230*rt*1 may include a first line portion 231*t* extending in the first direction DR1 and electrically connected to the third electrodes 230, a second line portion 232*t* extending in the second direction DR2 from a first end portion of the first line portion 231*t*, and a third line portion 233*t* extending in the second direction DR2 from a second end portion of the first line portion 231*t*.

In an embodiment of the present disclosure, a resistance of the second line portion 232*t* and a resistance of the third line portion 233*t* may each be the same or substantially the same as a resistance of one of the third electrodes 230. Thus, the second line portion 232*t* and the third line portion 233*t* may serve as the third electrodes 230, and the same effect as if the third electrodes 230 were also disposed in the peripheral region 200NA may be obtained. For example, any one of the second line portion 232*t* or the third line portion 233*t* and any one of the third electrodes 230 may form a coil. Thus, a pen positioned in a region adjacent to the peripheral region 200NA may also be sufficiently charged due to a loop including the second line portion 232*t* or the third line portion 233*t*.

In an embodiment of the present disclosure, a width, in the first direction DR1, of each of the second line portion 232*t* and the third line portion 233*t* may be variously adjusted so as to adjust a resistance of the second line portion 232*t* and a resistance of the third line portion 233*t*. However, the present disclosure is not limited thereto, and the first to third line portions 231*t*, 232*t*, and 233*t* may have the same or substantially the same width as each other.

The fifth trace lines 230*rt*2 may be connected in one-to-one correspondence to first electrode groups 230*pc*. In other words, the number of fifth trace lines 230*rt*2 may correspond to the number of first electrode groups 230*pc*. FIG. 7 illustrates three fifth trace lines 230*rt*2 and three first electrode groups 230*pc*.

In an embodiment of the present disclosure, the fifth trace lines 230*rt*2 and the fifth pads PD5 may be omitted as needed or desired, and a charge driving mode for charging a pen may be omitted. In this case, the sensor layer 200 may sense an input by an active-type pen that is capable of emitting a magnetic field, even if a magnetic field is not provided from the sensor layer 200.

The fourth trace lines 240*t* may be spaced apart from each other with the sensing region 200A therebetween. The fourth trace lines 240*t* may be electrically connected in a one-to-one correspondence to the second electrode groups 240*pc*. FIG. 7 illustrates that two second electrode groups 240*pc* are arranged as an example. The fourth trace line 240*t* connected to one second electrode group 240*pc* and the fourth trace line 240*t* connected to the other second electrode group 240*pc* may be spaced apart from each other with the sensing region 200A therebetween. However, the present disclosure is not limited thereto.

Figure 8A:
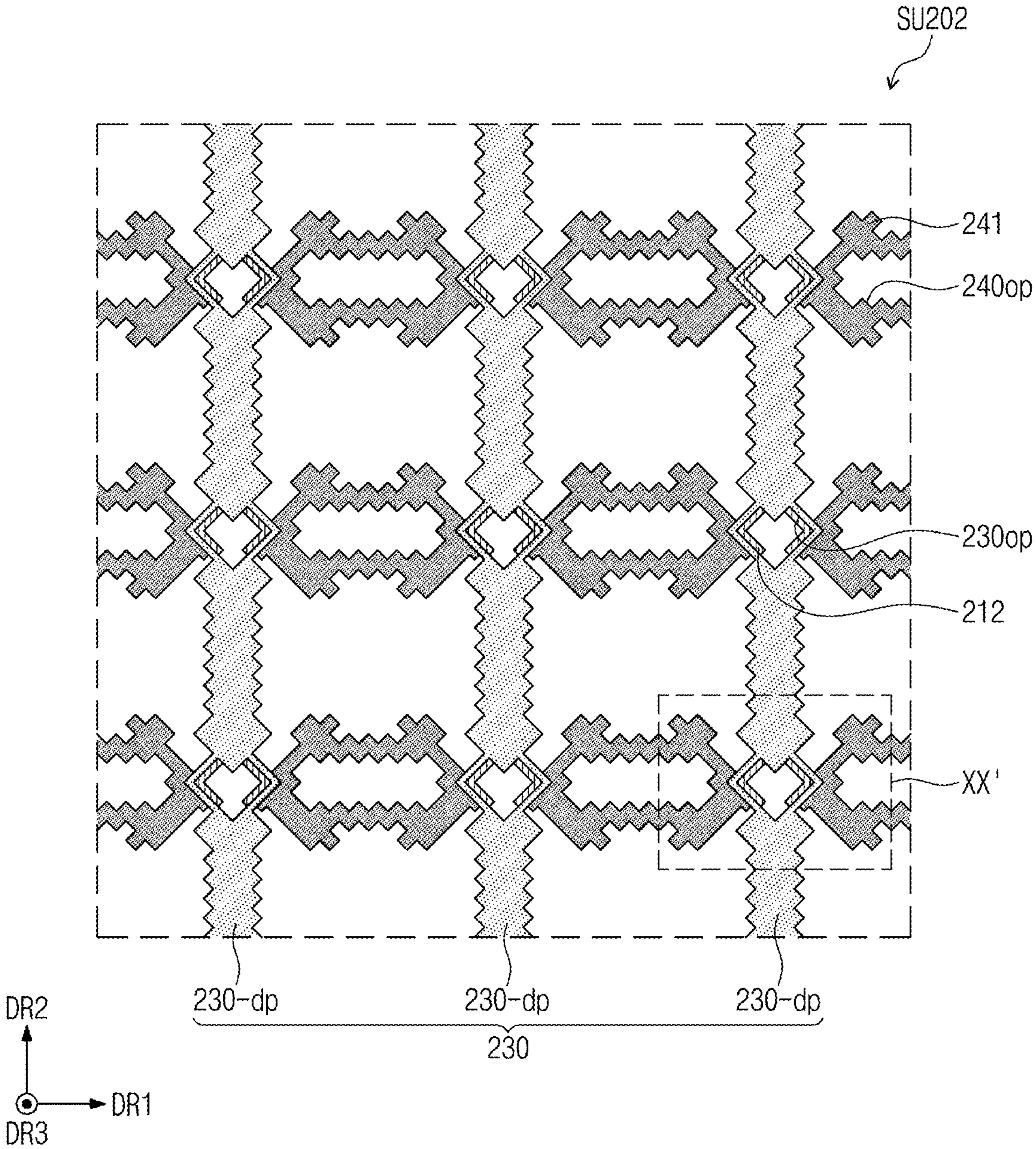
FIG. 8A is a plan view illustrating a first conductive layer of a sensing unit according to an embodiment of the present disclosure.
Figure 8B:
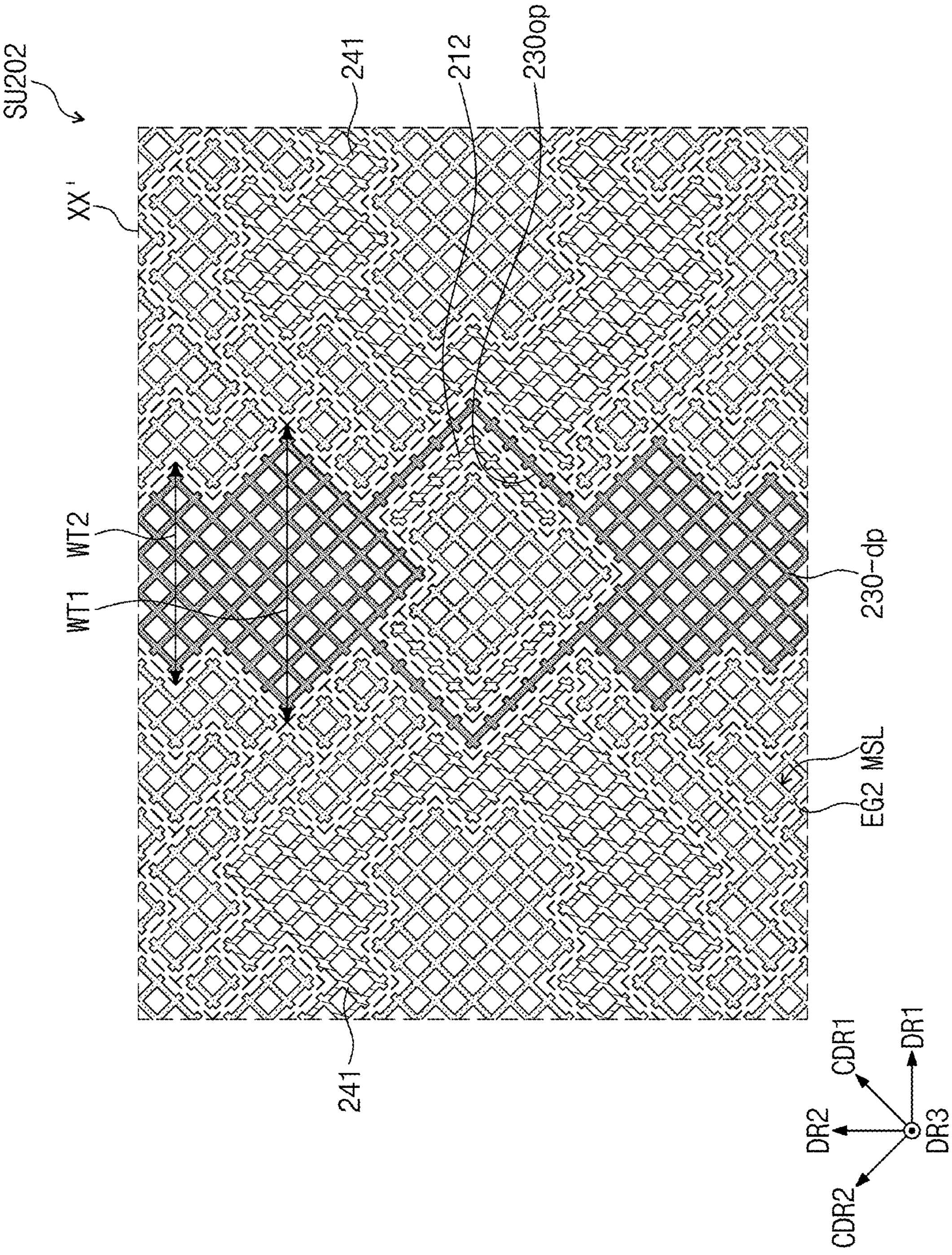
FIG. 8B is an enlarged plan view of the region XX' of FIG. 8A.
Figure 9A:
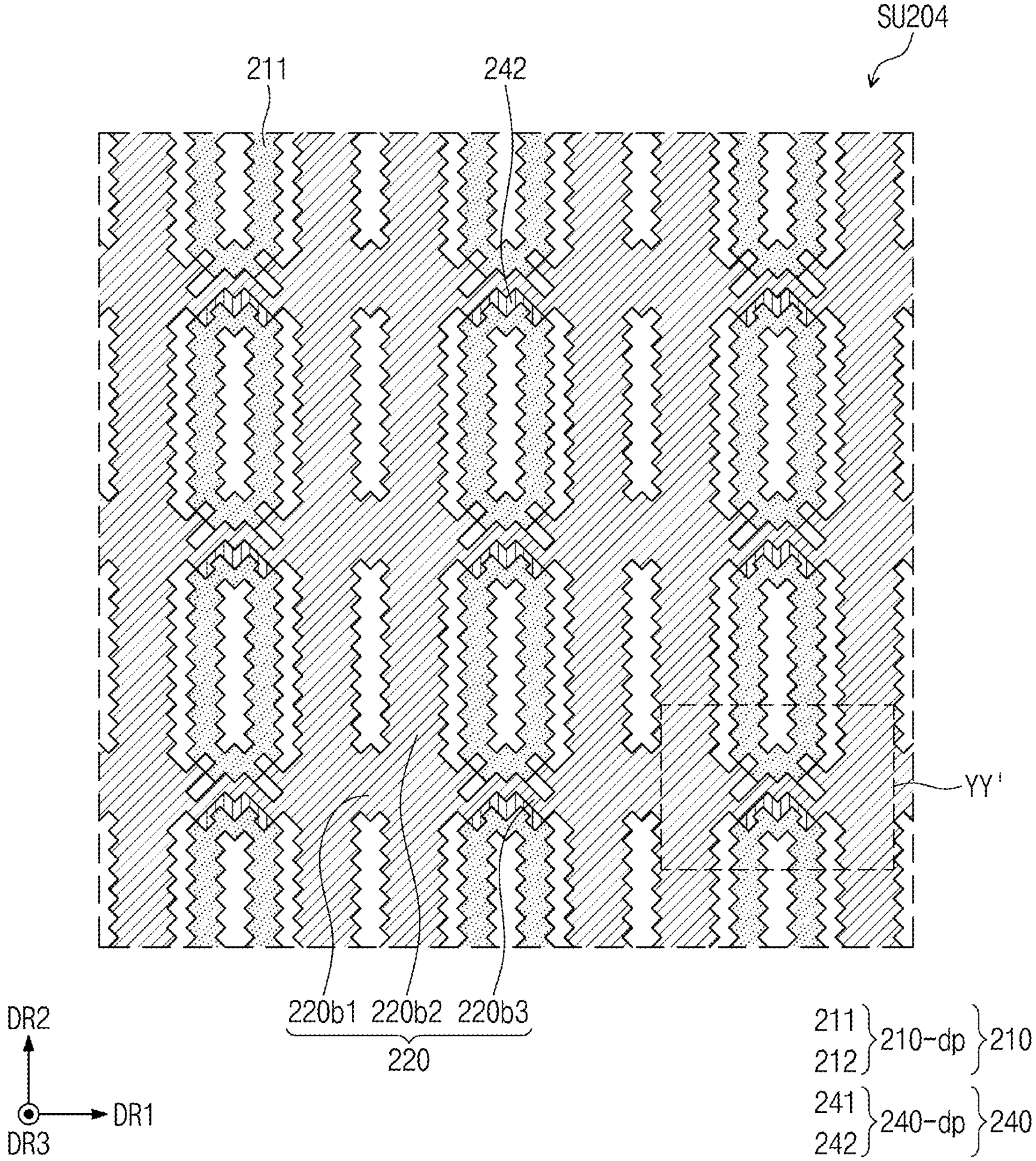
FIG. 9A is a plan view illustrating a second conductive layer of a sensing unit according to an embodiment of the present disclosure.
Figure 9B:
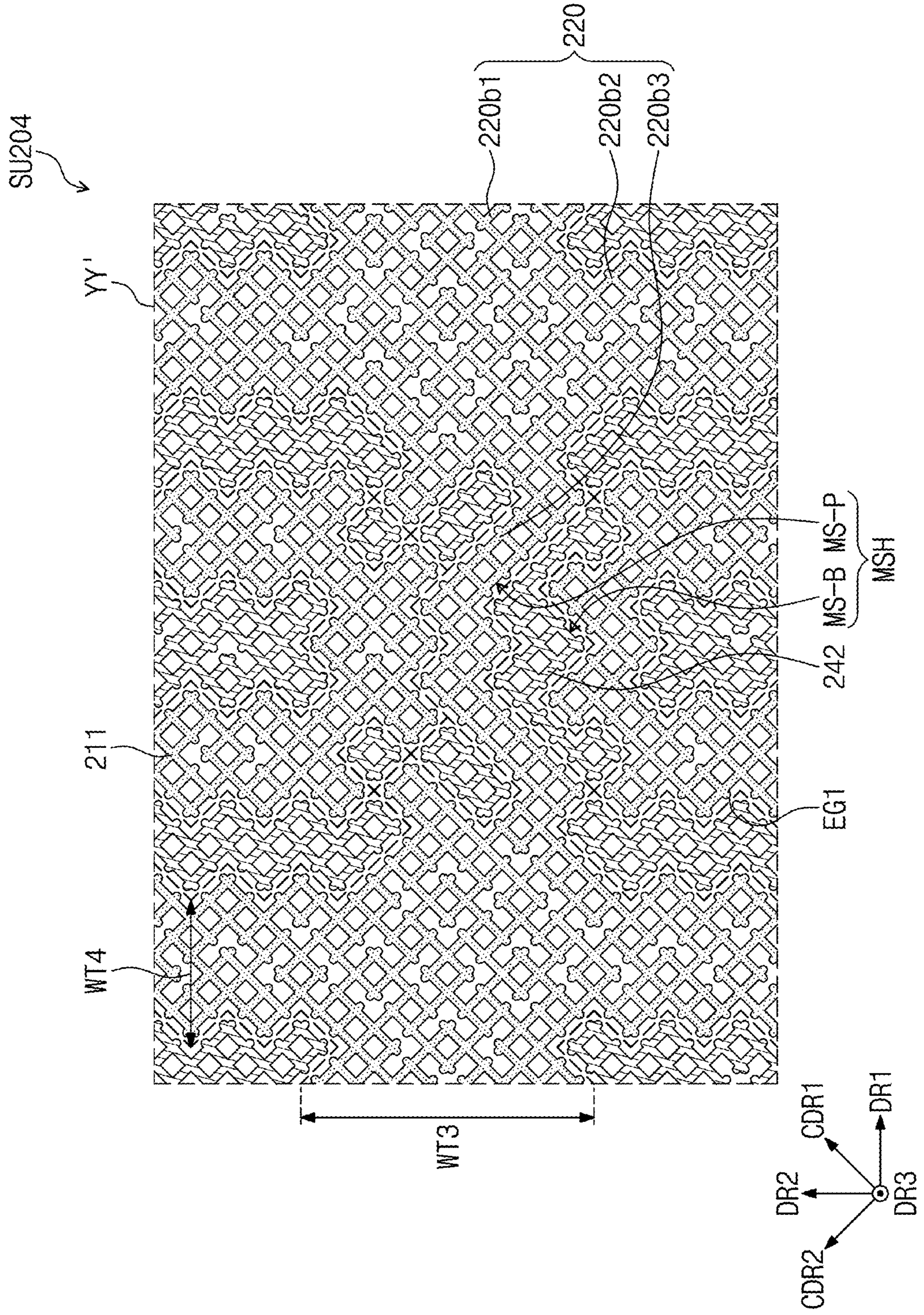
FIG. 9B is an enlarged plan view of the region YY' of FIG. 9A.

FIG. 8A is a plan view illustrating a first conductive layer SU202 of the sensing unit SU according to an embodiment of the present disclosure. FIG. 8B is an enlarged plan view of the region XX' of FIG. 8A. FIG. 9A is a plan view illustrating a second conductive layer SU204 of the sensing unit SU according to an embodiment of the present disclosure. FIG. 9B is an enlarged plan view of the region YY' of FIG. 9A.

FIGS. 8A and 9A schematically illustrate a boundary of each of the components as a line without illustrating a shape of a mesh structure thereof. In other words, it may be understood that the lines illustrated in FIGS. 8A and 9A correspond to cutting lines along which a mesh structure illustrated in FIGS. 8B and 9B is cut, and FIGS. 8B and 9B illustrate the cutting lines as a dashed line.

A shape of the sensing unit SU illustrated in FIGS. 7, 8A, 8B, 9A, and 9B is shown as an example, and the present disclosure is not limited thereto. The shape of the sensing unit SU may be variously modified as needed or desired.

Referring to FIGS. 7, 8A, 8B, 9A, and 9B, a first electrode 210 may include a plurality of first division electrodes 210-*dp* spaced apart from each other in a first direction DR1. The first division electrodes 210-*dp* may each include a plurality of first patterns 211, and a plurality of first bridge patterns 212 electrically connected to the first patterns 211. The first patterns 211 arranged to be spaced apart from each other in a second direction DR2 may be electrically connected to each other by the first bridge patterns 212. Thus, the first division electrodes 210-*dp* may each extend in the second direction DR2, and may be spaced apart from each other in the first direction DR1.

A third electrode 230 may include a plurality of second division electrodes 230-*dp* spaced apart from each other in the first direction DR1. The second division electrodes 230-*dp* may each extend along the second direction DR2. The second division electrodes 230-*dp* may be spaced apart from each other in the first direction DR1.

When viewed in a third direction DR3 (e.g., in a plan view), the second division electrodes 230-*dp* may overlap with the first division electrodes 210-*dp* in a one-to-one correspondence. As used herein, the term "overlap" also means that at least a portion of one first division electrode 210-*dp* and at least a portion of one second division electrode 230-*dp* overlap with each other.

FIGS. 8A and 9A illustrate that three first division electrodes 210-*dp* and three second division electrodes 230-*dp* are included in one sensing unit SU as an example, but the present disclosure is not limited thereto. For example, each of the number of first division electrodes 210-*dp* and the number of second division electrodes 230-*dp* included in one sensing unit SU may be one, two, or at least four. Each of the first division electrodes 210-*dp* and the second division electrodes 230-*dp* may correspond to a resistive path or a signal transmission path through which a signal is transmitted.

Referring to FIGS. 7 and 8A together, one fifth trace line 230*rt*2 is electrically connected to one first electrode group 230*pc*. One first electrode group 230*pc* may include two third electrodes 230. In this case, one fifth trace line 230*rt*2 may be electrically connected to six second division electrodes 230-*dp*. In this case, a degree of an increase in the number of pads in the sensor layer 200 may be reduced.

In a case in which the first electrode 210 in one sensing unit SU includes the first division electrodes 210-*dp*, the first division electrodes 210-*dp* may be disposed in a relatively even distribution, compared to a case in which the first electrode 210 in one sensing unit SU is not divided and has a single shape. In this case, a signal may be evenly provided or sensed in one sensing unit SU.

In addition, in a case in which the first electrode 210 in one sensing unit SU includes the first division electrodes 210-*dp*, the number of the first bridge patterns 212 in one sensing unit SU may be increased, compared to a case in which the first electrode 210 in one sensing unit SU is not divided. FIG. 8A illustrates that, when two first bridge patterns 212 connected to the same two first patterns 211 are considered as one pair, nine pairs of first bridge patterns 212 are disposed as an example. In other words, a total of eighteen first bridge patterns 212 are illustrated.

In more detail, an increase in the number of first bridge patterns 212 arranged in the first direction DR1 crossing the second direction DR2 that is a direction in which the first electrode 210 extends may correspond to an increase in the number of signal paths. Thus, as the number of signal paths increases, a resistance of the first electrode 210 may be reduced. As a result, a sensing sensitivity of the sensor layer 200 may be improved.

In addition, a shape of each of the first division electrodes 210-*dp* may be close to (e.g., similar to) a bar shape extending in the second direction DR2, and as the shape of each of the first division electrodes 210-*dp* is close to the bar shape, a resistive path may be shortened. Thus, when the resistive path is shortened and the number of resistive paths connected in parallel with each other in one first electrode 210 is increased, a resistance of the first electrode 210 may be reduced. As a result, a sensing sensitivity of the sensor layer 200 may be improved.

In addition, as the shape of each of the first division electrodes 210-*dp* is close to the bar shape extending in the second direction DR2, a proportion of an area size capable of being utilized in a pattern design in a total area size of one sensing unit SU may be increased. Thus, a degree of freedom in the pattern design may be improved.

According to an embodiment of the present disclosure, a degree of freedom in a pattern design of the sensing unit SU may be improved, and a resistance of an electrode included in the sensing unit SU may be reduced. In this case, securing a frequency range (e.g., a bandwidth) that is capable of being applied to a signal provided to the sensor layer 200 may be facilitated. Thus, a degree of freedom in a frequency selection may be improved.

According to an embodiment of the present disclosure, each of the first patterns 211 may have a loop shape, and a portion of each of the second division electrodes 230-*dp* overlapping with the first patterns 211 may be close to (e.g., may be similar to) a bar shape. In this case, an overlapping area size of the first electrode 210 and the third electrode 230 may be easily adjusted by adjusting an internal diameter of each of the first patterns 211, a width of each of the second division electrodes 230-*dp*, or the like.

According to an embodiment of the present disclosure, the first division electrode 210-*dp* may include the first patterns 211 and the first bridge patterns 212 disposed at (e.g., in or on) different layers from each other, and the first patterns 211 and the first bridge patterns 212 may be electrically connected to each other through a contact. In this case, a resistance may be relatively increased compared to a case in which the first patterns 211 and the first bridge patterns 212 are disposed at (e.g., in or on) the same layer as each other and integrally provided.

In an embodiment of the present disclosure, a resistance of a portion of the second division electrode 230-*dp* overlapping with the first pattern 211 may be lower than a resistance of the first pattern 211. However, the present disclosure is not limited thereto, and the resistance relationship may be variously modified as needed or desired according to a width of a loop of the first pattern 211 or a width of a portion of the second division electrode 230-*dp*.

The second division electrode 230-*dp* may extend in the second direction in the same layer. Thus, there may be no increase in a resistance due to a change in a layer in the second division electrode 230-*dp*. The second division electrode 230-*dp* may be an electrode to which a signal is applied in a charge driving mode described in more detail below. Thus, the lower the resistance of the second division electrode 230-*dp* is, the stronger the intensity of a magnetic field and a current for charging a resonant circuit of the pen PN (e.g., see FIG. 5) may be.

According to an embodiment of the present disclosure, the second division electrode 230-*dp* may have a relatively narrow shape compared to that of the first division electrode 210-*dp*, because a portion of each of the second division electrodes 230-*dp* overlapping with the first patterns 211 is close to a bar shape. In this case, a parasitic capacitance caused in each of the second division electrodes 230-*dp* may be reduced. Thus, a performance of the sensor layer 200 may be improved.

Referring to FIG. 8B, the second division electrode 230-*dp* may include a first portion having a first width WT1 in the first direction DR1, and a second portion having a second width WT2 in the first direction DR1. The first width WT1 may be greater than the second width WT2. For example, the first portion having the first width WT1 may be closer to the first bridge patterns 212 than the second portion having the second width WT2.

In a plan view, the first portion having the first width WT1 may overlap with the first patterns 211, and may form a capacitance. In addition, the second portion having the second width WT2 may overlap with a dummy pattern surrounded (e.g., around a periphery thereof) by the first patterns 211. An overlapping area size of the first electrode 210 and the third electrode 230 may be easily adjusted by adjusting the second width WT2.

An opening 230*op* may be defined in the second division electrode 230-*dp*, and two first bridge patterns 212 may be disposed in the opening 230*op*. In a case in which the first bridge patterns 212 are surrounded (e.g., around a periphery thereof) by the second division electrode 230-*dp*, capacitances among capacitances that occur in the first electrode 210 having a value that is changed according to a temperature may be reduced. Thus, temperature characteristics of the sensor layer 200 may be improved.

The second electrode 220 may include a plurality of first branch portions 220*b*1 extending in the first direction DR1, a plurality of second branch portions 220*b*2 extending in the second direction DR2 crossing the first direction DR1, and a connection portion 220*b*3 disposed between the first patterns 211. The first branch portions 220*b*1 may be spaced apart from each other in the second direction DR2, and the second branch portions 220*b*2 may be spaced apart from each other in the first direction DR1. The first branch portions 220*b*1, the second branch portions 220*b*2, and the connection portion 220*b*3 may be connected to each other and have an integrated form.

The fourth electrode 240 may include a plurality of third division electrodes 240-*dp* spaced apart from each other in the second direction DR2. The third division electrodes 240-*dp* may each extend in the first direction DR1. The third division electrodes 240-*dp* may each include a plurality of second patterns 241, and a plurality of second bridge patterns 242 electrically connected to the second patterns 241. The second patterns 241 may each have a loop shape. The second patterns 241 and the second bridge patterns 242 may be electrically connected to each other through contact holes defined in the intermediate insulating layer 203 (e.g., see FIG. 6A). Two second patterns 241 adjacent to each other may be spaced apart from each other with one second division electrode 230-*dp* and two first bridge patterns 212 therebetween.

In an embodiment of the present disclosure, a third width WT3 of the first branch portions 220*b*1 in the second direction DR2 may be greater than a fourth width WT4 of the second branch portions 220*b*2 in the first direction DR1. For example, the first branch portions 220*b*1 may overlap with the second patterns 241 and a dummy pattern surrounded (e.g., around a periphery thereof) by the second patterns 241. An overlapping area size of the second electrode 220 and the fourth electrode 240 may be easily adjusted by adjusting the third width WT3. As another example, an overlapping area size of the second electrode 220 and the fourth electrode 240 may be easily adjusted by adjusting an internal diameter of a loop shape of each of the second patterns 241 surrounding (e.g., around a periphery of) a dummy pattern.

In an embodiment of the present disclosure, the third division electrodes 240-*dp* may each include the second patterns 241 and the second bridge patterns 242 disposed at (e.g., in or on) different layers from each other, and the second patterns 241 and the second bridge patterns 242 may be electrically connected to each other through a contact. In this case, a resistance may be relatively increased compared to a case in which the second patterns 241 and the second bridge patterns 242 are disposed at (e.g., in or on) the same layer as each other and integrally provided.

In an embodiment of the present disclosure, the third electrode 230 corresponds to a component that transmits a signal when performing a touch sensing or a pen sensing, and the fourth electrode 240 corresponds to a component that forms a capacitance with the third electrode 230 when a pen is sensed. Thus, it may be desirable to reduce a resistance of the third electrode 230 rather than to reduce a resistance of the fourth electrode 240. As such, the third electrode 230 may be embodied as the same one layer, and the fourth electrode 240 may be embodied as two different layers.

Referring to FIGS. 8B and 9B, the second bridge pattern 242 may include one line (e.g., only one line) extending in a first cross direction CDR1 or a second cross direction CDR2 in a partial section. In this case, the first bridge pattern 212 overlapping with the second bridge pattern 242 may insulatively cross the second bridge pattern 242 in the partial section. In this case, a capacitance between the first bridge pattern 212 and the second bridge pattern 242 may be minimized or reduced.

Referring to FIGS. 8B and 9B, the second division electrodes 230-*dp*, the second patterns 241, the first patterns 211, the second electrode 220, and the second bridge patterns 242 may each have a mesh structure. The mesh structures may each include a plurality of mesh lines. The plurality of mesh lines may each have a shape extending in a suitable direction (e.g., a predetermined direction), and may be connected to each other. The shape may include various suitable shapes, such as a straight line, a line having a protrusion, and an uneven line. Openings of which at least a portion is surrounded thereof by the mesh lines may be defined (e.g., may be provided or formed) in each of the mesh structures. The openings may overlap with the light-emitting region PXA (e.g., see FIG. 6A), and the mesh lines may overlap with the non-light-emitting region NPXA. However, the present disclosure is not limited thereto.

FIGS. 8B and 9B illustrates that the mesh structure includes mesh lines extending in the first cross direction CDR1 crossing the first direction DR1 and the second direction DR2, and mesh lines extending in the second cross direction CDR2 crossing the first cross direction CDR1. However, a direction in which mesh lines constituting a mesh structure extend is not particularly limited to that shown in FIGS. 8B and 9B. For example, the mesh structure may include only mesh lines extending in the first direction DR1 and the second direction DR2, or may include mesh lines extending in the first direction DR1, the second direction DR2, the first cross direction CDR1, and the second cross direction CDR2. In other words, the mesh structure may be changed in various forms as needed or desired.

In an embodiment of the present disclosure, a first capacitance may be defined between the first electrode 210 and the third electrode 230, and a second capacitance may be defined between the second electrode 220 and the fourth electrode 240. A magnitude of the first capacitance and a magnitude of the second capacitance may be adjusted by an overlapping area size between the first electrode 210 and the third electrode 230 and an overlapping area size between the second electrode 220 and the fourth electrode 240.

As the first and second capacitances are increased, the amount of an induced current transmitted from the third electrode 230 to the first electrode 210 may be increased, and the amount of an induced current transmitted from the fourth electrode 240 to the second electrode 220 may be increased. Thus, as the first and second capacitances are increased, a pen sensing performance of the sensor layer 200 may be improved. In addition, when performing a touch sensing, the first and second capacitances may act as a load. Thus, as the first and second capacitances are reduced, a touch sensing performance may be improved.

According to some embodiments of the present disclosure, an overlapping area size of the first electrode 210 and the third electrode 230 and an overlapping area size of the second electrode 220 and the fourth electrode 240 may be easily adjusted. Thus, the sensor layer 200 having desired capacitances at an appropriate level in consideration of a desired touch sensitivity and a desired pen sensing sensitivity may be provided. As a result, the electronic device 1000 (e.g., see FIG. 1A) having an improved pen sensitivity and touch sensitivity may be provided.

According to some embodiments of the present disclosure, the first conductive layer SU202 and the second conductive layer SU204 may each have a mesh structure. For example, the first conductive layer SU202 may include a plurality of lower mesh lines MSL, and the second conductive layer SU204 may include a plurality of upper mesh lines MSH. Hereinafter, the upper mesh lines MSH may be referred to as first mesh lines MSH, and the lower mesh lines MSL may be referred to as second mesh lines MSL.

The first patterns 211, the second electrode 220, and the second bridge patterns 242 included in the second conductive layer SU204 may each include the first mesh lines MSH. The first bridge pattern 212, the third electrode 230, and the second patterns 241 included in the first conductive layer SU202 may each include the second mesh lines MSL.

The first mesh lines MSH may include a plurality of first end portions EG1, and the second mesh lines MSL may include a plurality of second end portions EG2. The first end portions EG1 may refer to an end of the first mesh lines MSH in a direction in which the first mesh lines MSH extend, and the second end portions EG2 may refer to an end of the second mesh lines MSL in a direction in which the second mesh lines MSL extend.

In an embodiment of the present disclosure, a shape of the first end portions EG1 and a shape of the second end portions EG2 may be different from each other. For example, at least some of the first end portions EG1 may have a curvature, and at least some of the second end portions EG2 may have a straight-line shape. The second conductive layer SU204 may be further spaced apart from the display layer 100 (e.g., see FIG. 6A) than the first conductive layer SU202. In other words, the second conductive layer SU204 may be a layer closer to a display surface that a user views. Thus, at least some of the first end portions EG1 included in the second conductive layer SU204 may be designed to have a curvature, so that a visibility of a pattern due to external light reflection may be reduced.

In an embodiment of the present disclosure, in the second conductive layer SU204 in one sensing unit SU, an area size of the components included in the second electrode 220 and the first electrode 210 may be greater than an area size of the components included in the fourth electrode 240 and the third electrode 230. The smaller a distance to the first input 2000 (e.g., see FIG. 4) is, the greater a change in capacitance due to the first input 2000 may be. Thus, a component for sensing the first input 2000 (e.g., see FIG. 4) may be disposed with a greater area size in a layer relatively closer to a surface of the electronic device 1000 (e.g., see FIG. 1A). As a result, a touch performance may be improved.

Patterns included in the second electrode 220 and the first electrode 210 may be mainly disposed in the second conductive layer SU204, and patterns included in the fourth electrode 240 and the third electrode 230 may be mainly disposed in the first conductive layer SU202. In other words, patterns having different shapes from each other may be disposed in the first conductive layer SU202 and the second conductive layer SU204. Thus, in an embodiment of the present disclosure, a position of a cutting line of the first conductive layer SU202 and a cutting line of the second conductive layer SU204 may be adjusted, so that the second end portions EG2 are all covered with the first mesh lines MSH. For reference, a cutting line indicates a position in which a portion of a mesh structure is removed.

According to an embodiment of the present disclosure, a plurality of lower gaps defined in the second mesh lines MSL may be all covered with the first mesh lines MSH. In this case, a portion of the second mesh lines MSL may be exposed in an upper gap between the first end portions EG1 of the first mesh lines MSH. This will be described in more detail below with reference to FIG. 13A.

In addition, in an embodiment of the present disclosure, some of the plurality of lower gaps defined in the second mesh lines MSL may be covered with the first mesh lines MSH, and some remaining lower gaps may not be covered with the first mesh lines MSH. In this case, shapes of the first end portions EG1 of the first mesh lines MSH may have different shapes according to whether they overlap with a lower gap or not, and this will be described in more detail below with reference to FIG. 13B. For reference, even if some remaining lower gaps are not covered with the first mesh lines MSH, second end portions MEGL (e.g., see FIG. 13B) of second mesh lines MSL spaced apart from each other with some remaining lower gaps therebetween may be covered with the first mesh lines MSH. Thus, even if an upper gap and a lower gap overlap with each other, the amount of reflection may not be increased due to the second end portions MEGL.

In an embodiment of the present disclosure, the first mesh lines MSH may include bridge mesh lines MS-B included in the second bridge pattern 242 and pattern mesh lines MS-P included in the first patterns 211 and the second electrode 220. End portions of each of the bridge mesh lines MS-B and the pattern mesh lines MS-P are illustrated as having a curvature as an example, but the present disclosure is not limited thereto.

In an embodiment of the present disclosure, the first end portions EG1 of the first mesh lines MSH in one sensor layer 200 may all have the same shape and the same curvature as each other, but the present disclosure is not limited thereto. For example, a curvature of some of the first end portions EG1 and a curvature of others of the first end portions EG1 may be different from each other. As another example, a shape of some of the first end portions EG1 and a shape of others of the first end portions EG1 may be different from each other. The first end portions EG1 having different curvatures or different shapes from each other may not be arranged according to a suitable rule (e.g., a specific or predetermined rule), and may be arranged randomly. In this case, a regularity due to external light reflection may be reduced, and thus, a pattern may be less likely to be viewed.

In an embodiment of the present disclosure, the first display panel DP1 may include a module region (e.g., a component region) overlapping with an electronic module (e.g., an electronic component), such as a camera module (e.g., a camera) or an infrared sensor. In some embodiments, the light-emitting element 100PE (e.g., see FIG. 6A) may be disposed in the module region and display an image. In some embodiments, the light-emitting element 100PE may be omitted in the module region. The sensing region 200A may include a first region overlapping with the module region, and a second region not overlapping with the module region. A light transmittance of the first region may be higher than a light transmittance of the second region. In an embodiment of the present disclosure, in one sensor layer 200, a shape or a curvature of the first end portions EG1 disposed in the first region and a shape or a curvature of the second end portions EG2 disposed in the second region may be different from each other.

Figure 10:
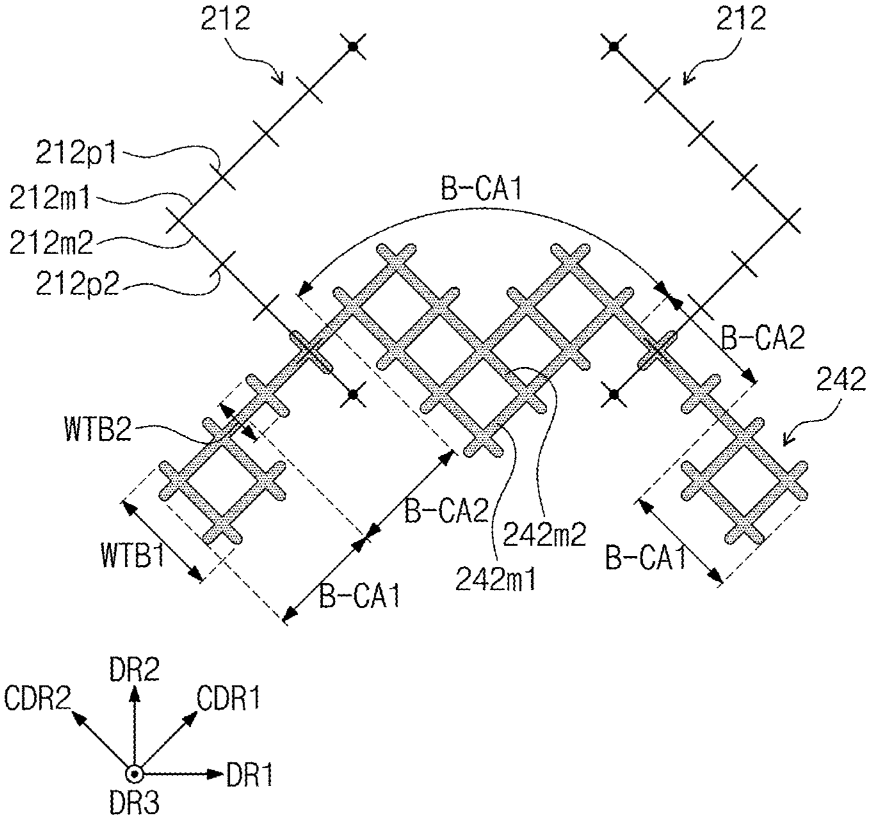
FIG. 10 is a plan view illustrating some components of a sensing unit according to an embodiment of the present disclosure.

FIG. 10 is a plan view illustrating some components of a sensing unit according to an embodiment of the present disclosure.

FIG. 10 illustrates one second bridge pattern 242, and two first bridge patterns 212 overlapping with the one second bridge pattern 242.

The first bridge patterns 212 may each include a first main line 212*m*1 extending in a first cross direction CDR1, and a second main line 212*m*2 extending in a second cross direction CDR2. One end portion of the first main line 212*m*1 and one end portion of the second main line 212*m*2 may cross each other. The first bridge pattern 212 may further include a plurality of first protrusion lines 212*p*1 crossing the first main line 212*m*1, and a plurality of second protrusion lines 212*p*2 crossing the second main line 212*m*2. The first protrusion lines 212*p*1 may be spaced apart from each other along the first cross direction CDR1, and the second protrusion lines 212*p*2 may be spaced apart from each other along the second cross direction CDR2. In another embodiment of the present disclosure, the first protrusion lines 212*p*1 and the second protrusion lines 212*p*2 may be omitted as needed or desired.

The second bridge pattern 242 may include first lines 242*m*1 extending in the first cross direction CDR1, and second lines 242*m*2 extending in the second cross direction CDR2. According to an embodiment of the present disclosure, the second bridge pattern 242 may include first portions B-CA1 in which at least two first lines 242*m*1 and at least two second lines 242*m*2 cross each other, and second portions B-CA2 in which one first line 242*m*1 and at least one second line 242*m*2 cross each other or at least one first line 242*m*1 and one second line 242*m*2 cross each other. The second portions B-CA2 may respectively cross the first bridge patterns 212.

In an embodiment of the present disclosure, the first portions B-CA1 each include at least two lines extending in the same direction as each other, and the second portions B-CA2 each include one line (e.g., only one line) extending in the same direction. Thus, a first minimum width WTB1 of the first portions B-CA1 may be greater than a minimum width WTB2 of the second portions B-CA2.

The first bridge patterns 212 overlapping with the second bridge pattern 242 may insulatively cross the second bridge pattern 242 in the second portions B-CA2. In this case, a capacitance between the first bridge patterns 212 and the second bridge pattern 242 may be reduced. In addition, remaining portions of the second bridge pattern 242 not overlapping with the first bridge patterns 212 may be provided in a form in which at least two first lines 242*m*1 and at least two second lines 242*m*2 cross each other, and thus, the second bridge pattern 242 may be less likely to be viewed due to a difference in a reflectance for external light.

Figure 11A:
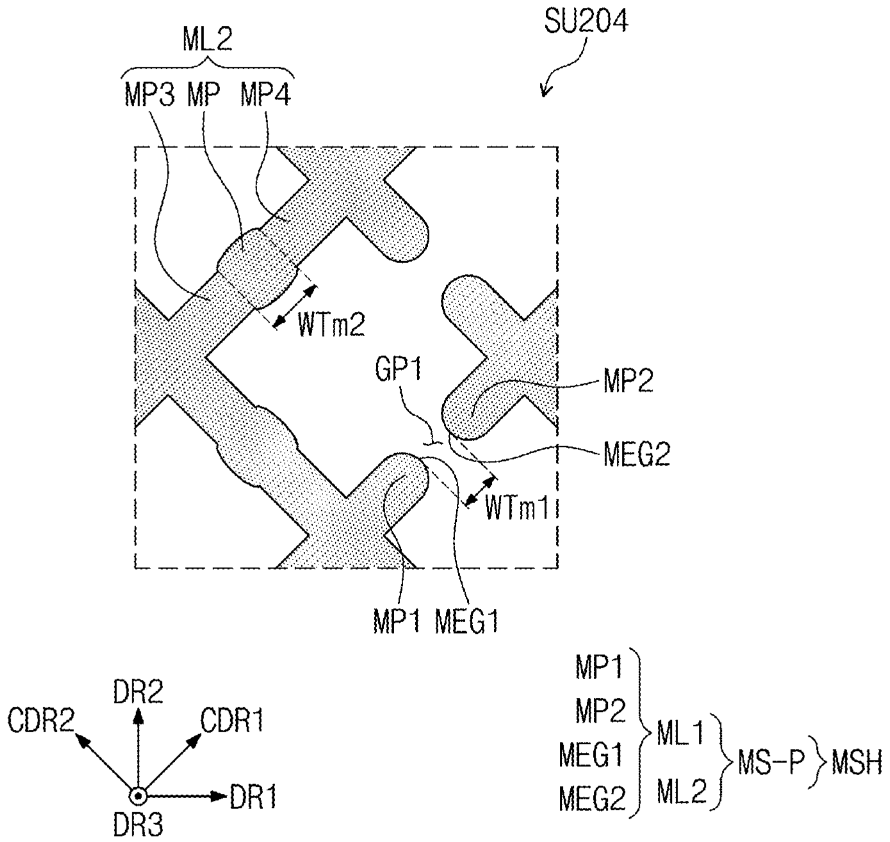
FIG. 11A is an enlarged plan view of a portion of a second conductive layer according to an embodiment of the present disclosure.

FIG. 11A is an enlarged plan view of a portion of a second conductive layer SU204 according to an embodiment of the present disclosure.

Referring to FIGS. 9B and 11A, the plurality of first mesh lines MSH may include the pattern mesh lines MS-P included in the first patterns 211 and the second electrode 220. The pattern mesh lines MS-P may include a first pattern mesh line ML1 extending along the first cross direction CDR1, and a second pattern mesh line ML2 extending along the first cross direction CDR1. The first pattern mesh line ML1 and the second pattern mesh line ML2 may be spaced apart from each other in the second cross direction CDR2 crossing the first cross direction CDR1.

The first pattern mesh line ML1 may include a first pattern portion MP1 and a second pattern portion MP2 spaced apart from each other with an upper gap GP1 therebetween. A first end portion MEG1 of the first pattern portion MP1 and a second end portion MEG2 of the second pattern portion MP2 may face each other, and may each have a curvature. FIG. 11A illustrates that the first end portion MEG1 and the second end portion MEG2 each have a single curvature, but the present disclosure is not limited thereto. For example, the first end portion MEG1 and the second end portion MEG2 may each have a shape in which a plurality of lines having different curvatures from each other are connected to each other.

According to an embodiment of the present disclosure, a portion of a lower conductive pattern, for example, such as a portion of a lower mesh line MSL (e.g., see FIG. 8B), may be disposed in a space between the first end portion MEG1 and the second end portion MEG2, or in other words, in the upper gap GP1, and may be exposed. Light travelling in the first cross direction CDR1 may be reflected at the lower mesh line MSL and the second end portion MEG2. According to an embodiment of the present disclosure, the first end portion MEG1 and the second end portion MEG2 each have a curvature. Thus, the amount of reflection of light incident in the first cross direction CDR1 may be reduced. As such, a visibility of a pattern due to external light reflection may be reduced, and the electronic device 1000 having an improved visibility may be provided.

The second pattern mesh line ML2 may include a third pattern portion MP3, a compensation portion MP, and a fourth pattern portion MP4. The fourth pattern portion MP4 may be spaced apart from the third pattern portion MP3 with the compensation portion MP therebetween. The compensation portion MP may face the upper gap GP1 in the second cross direction CDR2, and an edge (e.g., a side surface) of the compensation portion MP may have a curvature. In a case in which the compensation portion MP has a curvature, the amount of a reflection of light travelling in the second cross direction CDR2 may be reduced. Thus, a difference in the amount of a reflection of the upper gap GP1 and the compensation portion MP may be reduced, because light travelling in the second cross direction CDR2 may not be reflected at the upper gap GP1.

In an embodiment of the present disclosure, a width WTm2 of the compensation portion MP may be equal to or greater than a width WTm1 of the upper gap GP1. Because the first end portion MEG1 and the second end portion MEG2 spaced apart from each other with the upper gap GP1 therebetween may each have a curvature, a width of a portion in which the amount of a reflection of light travelling in the second cross direction CDR2 is relatively small may be greater than a width of the upper gap GP1. Thus, the width WTm2 of the compensation portion MP may be equal to or greater than the width WTm1 of the upper gap GP1.

In an embodiment of the present disclosure, an edge of the compensation portion MP is illustrated as having a convex shape. Thus, a width of the compensation portion MP, for example, in the second cross direction CDR2, may be greater than a width of the third pattern portion MP3 (e.g., in the second cross direction CDR2).

Figure 11B:
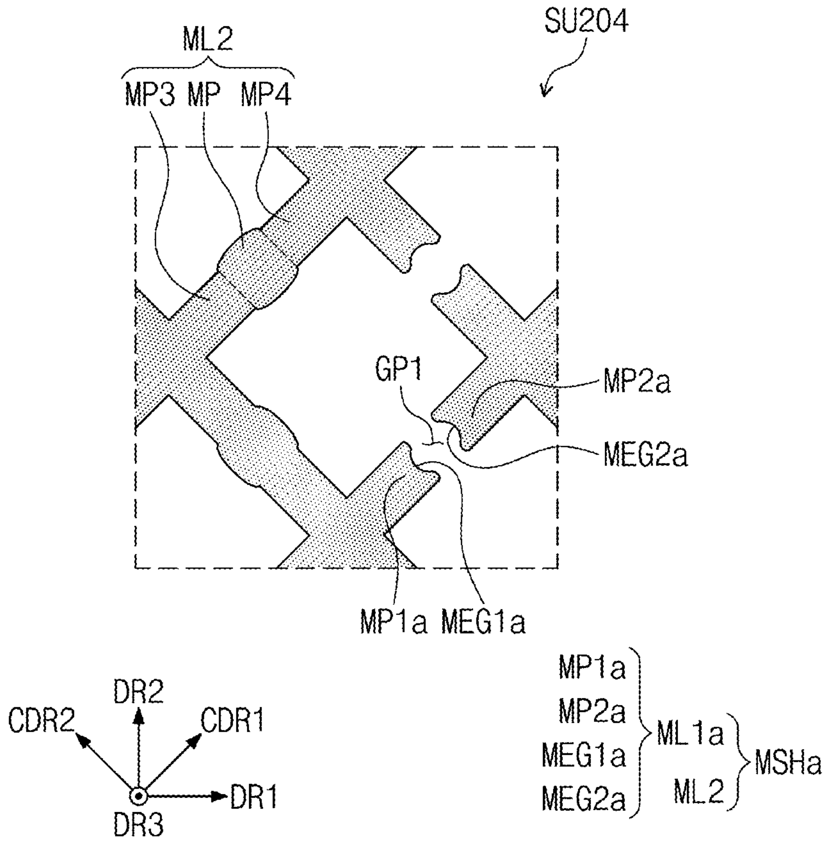
FIG. 11B is an enlarged plan view of a portion of a second conductive layer according to an embodiment of the present disclosure.

FIG. 11B is an enlarged plan view of a portion of a second conductive layer according to an embodiment of the present disclosure. In FIG. 11B, a component that is the same or substantially the same as that described above with reference to FIG. 11A may be denoted by the same reference numbers or symbols, and thus, redundant description thereof may not be repeated hereinafter.

Referring to FIG. 11B, a plurality of first mesh lines MSHa may include a first pattern mesh line ML1*a* extending in the first cross direction CDR1, and a second pattern mesh line ML2 extending in the first cross direction CDR1. The first pattern mesh line ML1*a* and the second pattern mesh line ML2 may be spaced apart from each other in the second cross direction CDR2 crossing the first cross direction CDR1.

The first pattern mesh line ML1*a* may include a first pattern portion MP1*a* and a second pattern portion MP2*a* spaced apart from each other with an upper gap GP1 therebetween. A first end portion MEG1*a* of the first pattern portion MP1*a* and a second end portion MEG2*a* of the second pattern portion MP2*a* may face each other, and may each have a curvature. In an embodiment of the present disclosure, the first end portion MEG1*a* and the second end portion MEG2*a* may each have a concave shape, and the amount of a reflection of light incident in the first cross direction CDR1 may be reduced. Thus, a visibility of a pattern due to external light reflection may be reduced, and the electronic device 1000 having an improved visibility may be provided.

Figure 11C:
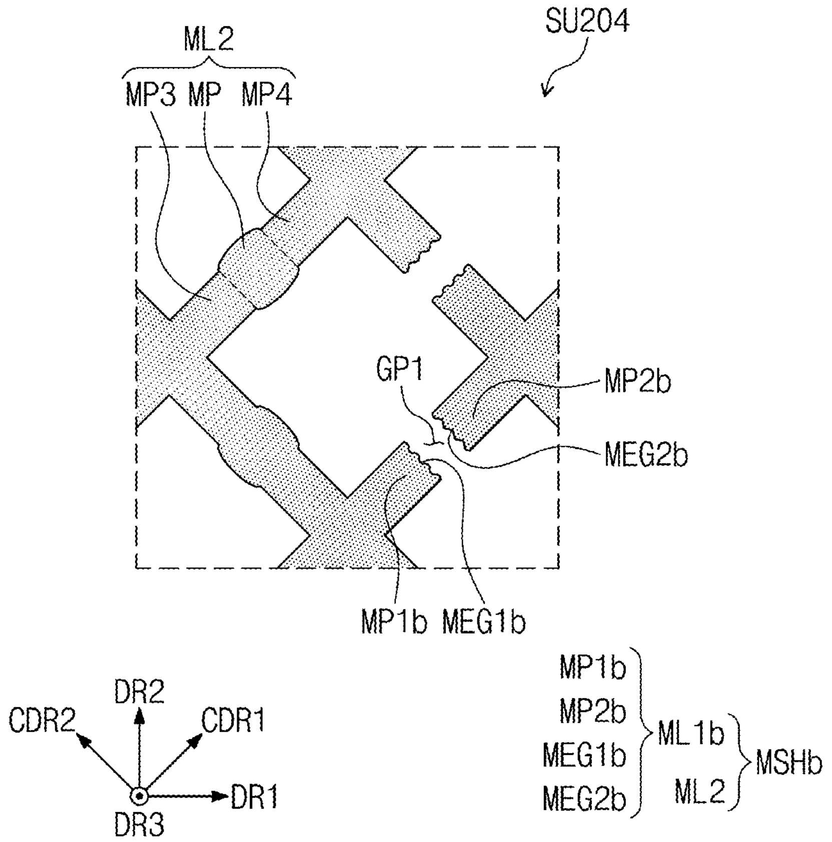
FIG. 11C is an enlarged plan view of a portion of a second conductive layer according to an embodiment of the present disclosure.

FIG. 11C is an enlarged plan view of a portion of a second conductive layer according to an embodiment of the present disclosure. In FIG. 11C, a component that is the same or substantially the same as that described above with reference to FIG. 11A may be denoted by the same reference numbers or symbols, and thus, redundant description thereof may not be repeated hereinafter.

Referring to FIG. 11C, a plurality of first mesh lines MSHb may include a first pattern mesh line ML1*b* extending in the first cross direction CDR1, and a second pattern mesh line ML2 extending in the first cross direction CDR1. The first pattern mesh line ML1*b* and the second pattern mesh line ML2 may be spaced apart from each other in the second cross direction CDR2 crossing the first cross direction CDR1.

The first pattern mesh line ML1*b* may include a first pattern portion MP1*b* and a second pattern portion MP2*b* spaced apart from each other with an upper gap GP1 therebetween. A first end portion MEG1*b* of the first pattern portion MP1*b* and a second end portion MEG2*b* of the second pattern portion MP2*b* may face each other, and may each have a curvature. In an embodiment of the present disclosure, the first end portion MEG1*b* and the second end portion MEG2*b* may each have an uneven shape, and the amount of a reflection of light incident in the first cross direction CDR1 may be reduced. Thus, a visibility of a pattern due to external light reflection may be reduced, and the electronic device 1000 having an improved visibility may be provided.

Figure 12A:
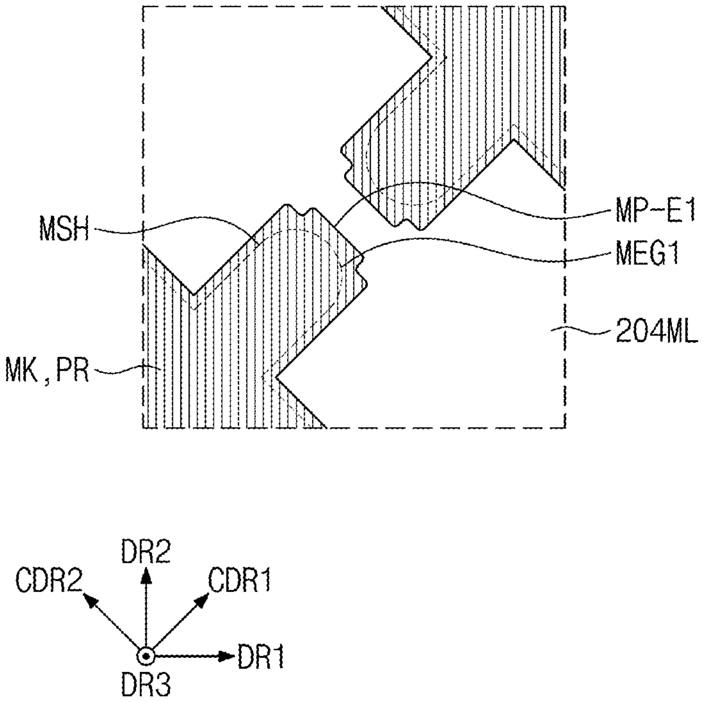
FIG. 12A is a plan view of a process of manufacturing a display panel according to an embodiment of the present disclosure.

FIG. 12A is a plan view of a process of manufacturing a display panel according to an embodiment of the present disclosure.

Referring to FIGS. 11A and 12A, a photoresist layer PR, and a mask MK for patterning a preliminary conductive layer 204ML are illustrated. The preliminary conductive layer 204ML may be the second conductive layer 204 (e.g., see FIG. 6A) before being patterned. The photoresist layer PR may be a layer that is formed through an exposing process using the mask MK, and a developing process. The photoresist layer PR may be a positive photoresist. Thus, the photoresist layer PR illustrated in FIG. 12A may be a pattern that remains through a developing process after an exposing process using the mask MK.

An end portion MP-E1 of the photoresist layer PR and the mask MK may have a protruding shape. For example, a shape of the end portion MP-E1 may include a step. First mesh lines MSH may be formed by patterning the preliminary conductive layer 204ML using the photoresist layer PR. During a process, a first end portion MEG1 of the first mesh lines MSH may be formed. A shape of the first end portion MEG1 and a shape of the end portion MP-E1 of the mask MK may be different from each other, and the first end portion MEG1 may have a curvature in the process of etching the preliminary conductive layer 204ML.

Figure 12B:
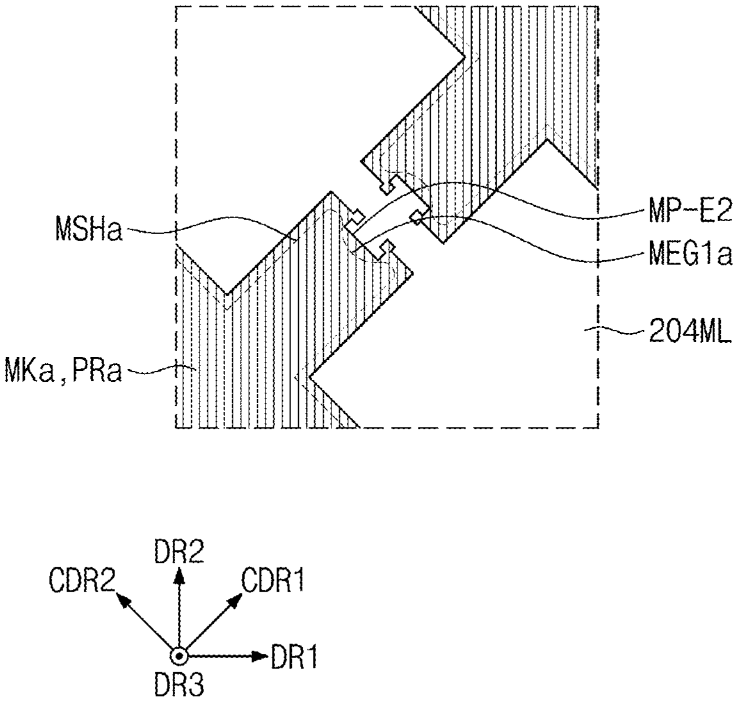
FIG. 12B is a plan view of a process of manufacturing a display panel according to an embodiment of the present disclosure.

FIG. 12B is a plan view of a process of manufacturing a display panel according to an embodiment of the present disclosure. In FIG. 12B, a component that is the same or substantially the same as that described above with reference to FIG. 12A may be denoted by the same reference numbers or symbols, and thus, redundant description thereof may not be repeated hereinafter.

Referring to FIGS. 11B and 12B, a photoresist layer PRa, and a mask MKa for patterning a preliminary conductive layer 204ML are illustrated. An end portion MP-E2 of the photoresist layer PRa and the mask MKa may have a concavely recessed shape. First mesh lines MSHa may be formed by patterning the preliminary conductive layer 204ML using the photoresist layer PRa. During a process, a first end portion MEG1*a* of the first mesh lines MSHa may be formed. A shape of the first end portion MEG1*a* and a shape of the end portion MP-E2 of the mask MKa may be different from each other, and the first end portion MEG1*a* may have a curvature in the process of etching the preliminary conductive layer 204ML.

Figure 12C:
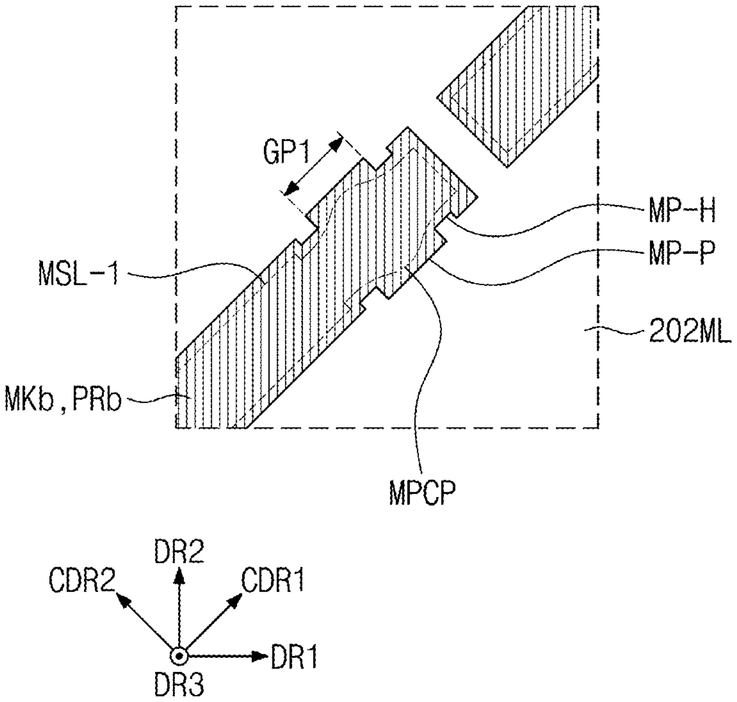
FIG. 12C is a plan view of a process of manufacturing a display panel according to an embodiment of the present disclosure.

FIG. 12C is a plan view of a process of manufacturing a display panel according to an embodiment of the present disclosure.

FIG. 12C illustrates a photoresist layer PRb, and a mask MKb for patterning a preliminary conductive layer 202ML. The preliminary conductive layer 202ML may be the first conductive layer 202 (e.g., see FIG. 6A) before being patterned. The photoresist layer PRb may be a layer that is formed through an exposing process using the mask MKb, and a developing process. The photoresist layer PRb may be a positive photoresist. Thus, the photoresist layer PRb illustrated in FIG. 12C may be a pattern that remains through a developing process after an exposing process using the mask MKb.

A portion of the photoresist layer PRb and the mask MKb may have a shape including a protruding portion MP-P and a recessed portion MP-H. Second mesh lines MSL-1 may be formed by patterning the preliminary conductive layer 202ML using the photoresist layer PRb. During a process, a curvature portion MPCP may be formed in a portion of the second mesh lines MSL-1 corresponding to the protruding portion MP-P and the recessed portion MP-H. A shape of the curvature portion MPCP and a shape of the protruding portion MP-P and the recessed portion MP-H of the mask MKb may be different from each other, and the curvature portion MPCP may be formed to have a curvature in a process of etching the preliminary conductive layer 202ML.

Figure 13A:
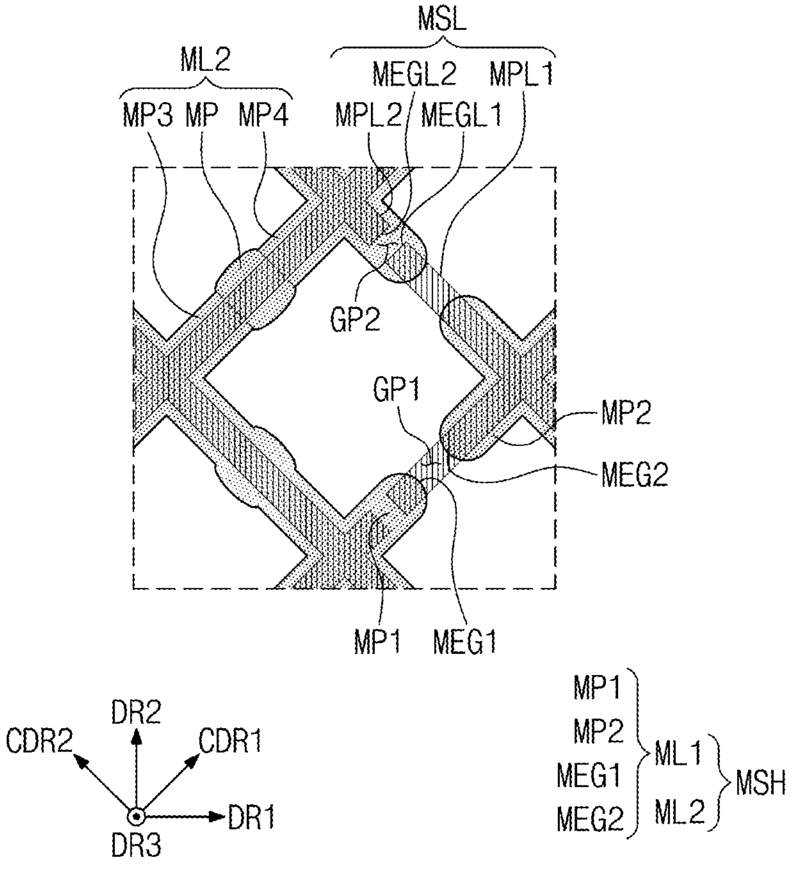
FIG. 13A is an enlarged plan view of a portion of a first conductive layer and a portion of a second conductive layer according to an embodiment of the present disclosure.

FIG. 13A is an enlarged plan view of a portion of the first conductive layer SU202 and a portion of the second conductive layer SU204 according to an embodiment of the present disclosure.

Referring to FIG. 13A, lower mesh lines MSL may include a first lower pattern portion MPL1 and a second lower pattern portion MPL2 spaced apart from each other with a lower gap GP2 therebetween. The first lower pattern portion MPL1 and the second lower pattern portion MPL2 may respectively include second end portions MEGL1 and MEGL2 facing each other.

According to an embodiment of the present disclosure, the second end portions MEGL1 and MEGL2 included in the lower mesh lines MSL may be covered with first mesh lines MSH. Thus, light incident from the outside may be less likely to reach the second end portions MEGL1 and MEGL2. Thus, the second end portions MEGL1 and MEGL2 may each have a straight-line shape.

According to an embodiment of the present disclosure, a portion of the lower mesh lines MSL may overlap with an upper gap GP1 between two first end portions MEG1 and MEG2 facing each other. Thus, the portion of the lower mesh lines MSL may be disposed in the upper gap GP1, and may be exposed.

Light travelling in the first cross direction CDR1 may be reflected at the lower mesh line MSL and a second end portion MEG2. According to an embodiment of the present disclosure, in a case in which a first end portion MEG1 and the second end portion MEG2 each have a curvature, the amount of a reflection of light incident in the first cross direction CDR1 may be reduced. Thus, a visibility of a pattern due to external light reflection may be reduced, and the electronic device 1000 having an improved visibility may be provided.

Figure 13B:
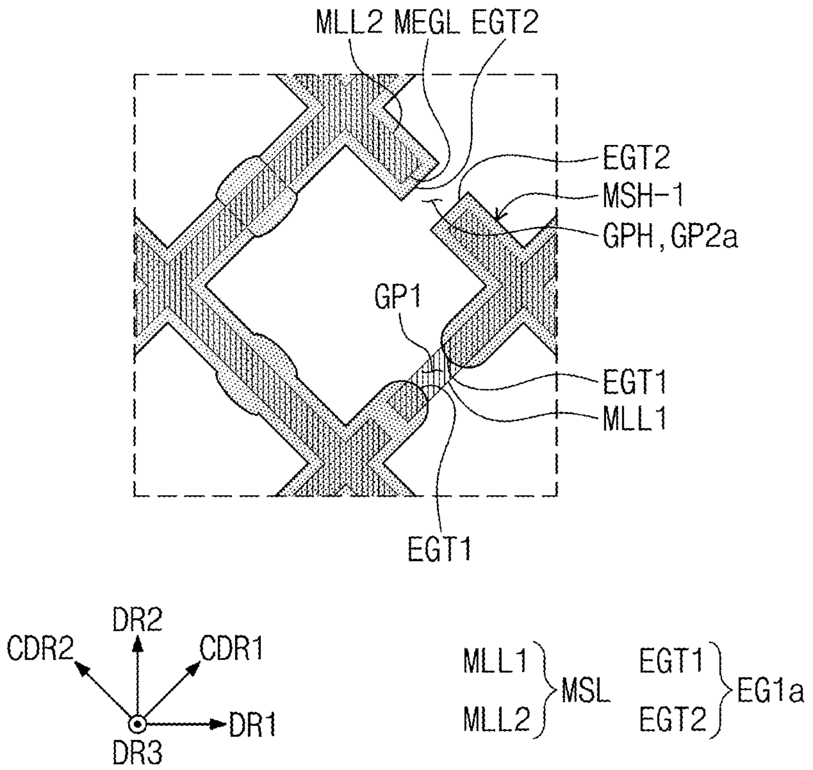
FIG. 13B is an enlarged plan view of a portion of a first conductive layer and a portion of a second conductive layer according to an embodiment of the present disclosure.

FIG. 13B is an enlarged plan view of a portion of the first conductive layer SU202 and a portion of the second conductive layer SU204 according to an embodiment of the present disclosure.

Referring to FIG. 13B, first end portions EG1*a* of first mesh lines MSH-1 may include a first-type end portion EGT1 having a curvature, and a second-type end portion EGT2 having a straight-line shape.

Second mesh lines MSL may include a first lower mesh line MLL1 and a second lower mesh line MLL2. In a plan view, the first lower mesh line MLL1 may protrude and extend from the first-type end portion EGT1. The second lower mesh line MLL2 may include a lower end portion MEGL having a straight-line shape, and the second lower mesh line MLL2 may not overlap with the second-type end portion EGT2. For example, the lower end portion MEGL may be spaced apart from the second-type end portion EGT2 (e.g., in a plan view).

For example, a portion of the first lower mesh line MLL1 may be exposed in an upper gap GP1 between first-type end portions EGT1 facing each other. An upper gap GPH between second-type end portions EGT2 facing each other may overlap with a lower gap GP2*a* between lower end portions MEGL facing each other. In other words, the second lower mesh line MLL2 may not be exposed in the upper gap GPH.

According to an embodiment of the present disclosure, even if the lower gap GP2*a* is not covered with the first mesh lines MSH-1, the second end portions MEGL of the second mesh lines MSL spaced apart from each other with the lower gap GP2*a* therebetween may be covered with the first mesh lines MSH-1. Thus, even if the upper gap GPH and the lower gap GP2*a* overlap with each other, external light reflection due to the second end portions MEGL may not occur.

A degree of reflection of light at the upper gap GP1 or GPH may be higher in a case in which a lower mesh line is exposed compared to a case in which the lower mesh line is not exposed. Thus, according to an embodiment of the present disclosure, the first-type end portion EGT1 disposed to overlap with the first lower mesh line MLL1 may have a curvature, and the second-type end portion EGT2 disposed not to overlap with the second lower mesh line MLL2 may have a straight-line shape.

Figure 13C:
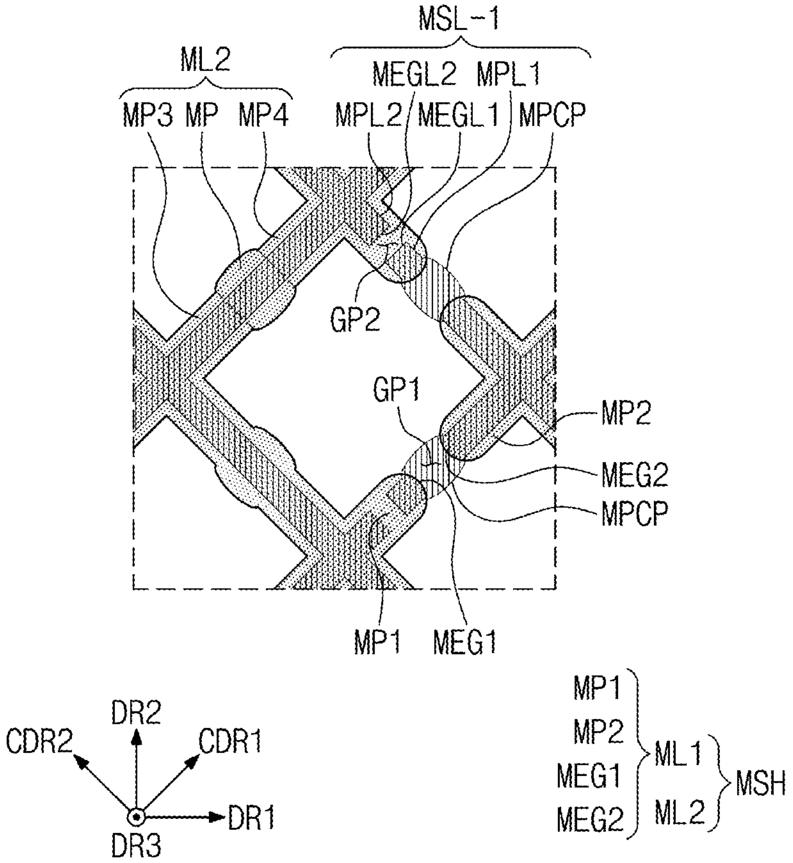
FIG. 13C is an enlarged plan view of a portion of a first conductive layer and a portion of a second conductive layer according to an embodiment of the present disclosure.

FIG. 13C is an enlarged plan view of a portion of the first conductive layer SU202 and a portion of the second conductive layer SU204 according to an embodiment of the present disclosure. In FIG. 13C, a component that is the same or substantially the same as that described above with reference to FIG. 13A may be denoted by the same reference numbers or symbols, and thus, redundant description thereof may not be repeated hereinafter.

Referring to FIG. 13C, a portion of lower mesh lines MSL-1 may overlap with an upper gap GP1 between two first end portions MEG1 and MEG2 facing each other. Thus, a portion of the lower mesh lines MSL-1 may be disposed in the upper gap GP1, and may be exposed.

According to an embodiment of the present disclosure, the lower mesh lines MSL-1 may include a curvature portion MPCP in a region overlapping with the upper gap GP1. Thus, an edge (e.g., a side surface) of the lower mesh lines MSL-1 that are exposed may have a curvature. In addition, a compensation portion MP and the curvature portion MPCP may face each other in the second cross direction CDR2. Similar to the compensation portion MP, in a case in which the exposed lower mesh lines MSL-1 have the curvature portion MPCP, even if light travelling in the second cross direction CDR2 is incident onto the curvature portion MPCP, the amount of reflection may be reduced.

Figure 14:
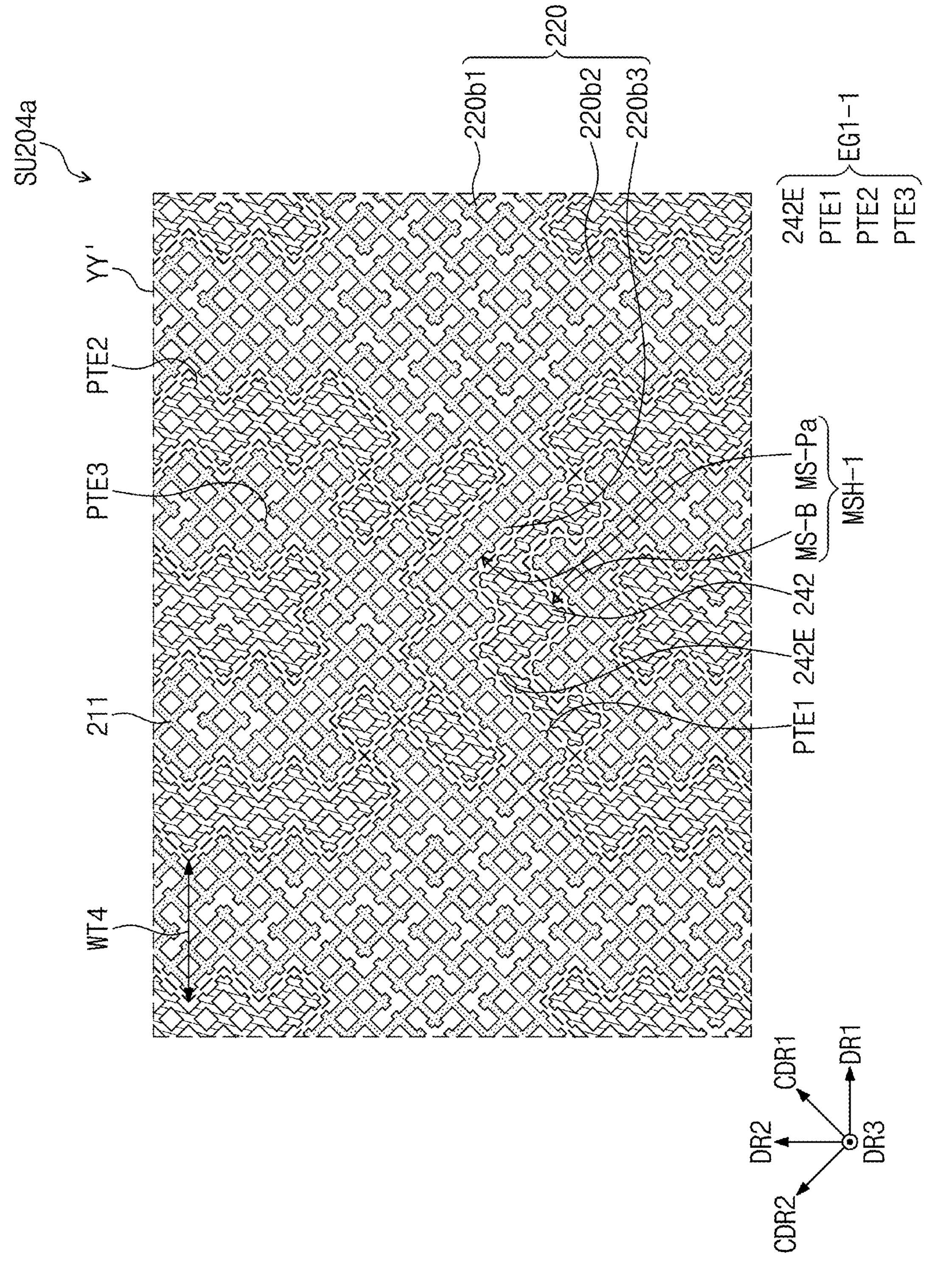
FIG. 14 is a plan view illustrating a second conductive layer according to an embodiment of the present disclosure.

FIG. 14 is a plan view illustrating a second conductive layer SU204*a* according to an embodiment of the present disclosure.

Referring to FIG. 14, the second conductive layer SU204*a* may include first mesh lines MSH-1. The first mesh lines MSH-1 may include bridge mesh lines MS-B included in a second bridge pattern 242, and pattern mesh lines MS-Pa included in first patterns 211 and a second electrode 220.

In an embodiment of the present disclosure, a shape of first end portions EG1-1 of the first mesh lines MSH-1 may be different from each other according to a position. For example, the first end portions EG1-1 may include an end portion 242E of each of the bridge mesh lines MS-B, and end portions PTE1, PTE2, and PTE3 of the pattern mesh lines MS-Pa.

In an embodiment of the present disclosure, the end portion 242E of each of the bridge mesh lines MS-B and the end portions PTE1, among the end portions PTE1, PTE2, and PTE3, facing the end portions 242E of the bridge mesh lines MS-B may have a curvature. In addition, remaining end portions PTE2 and PTE3 among the end portions PTE1, PTE2, and PTE3 of the pattern mesh lines MS-Pa may have a straight-line shape. A boundary end portion PTE2 facing a boundary between patterns and internal end portions PTE3 facing each other in one pattern among the remaining end portions PTE2 and PTE3 may be included. The internal end portions PTE3 may be formed by being visibility cut, which is provided so that a pattern is not viewed from the outside, and may be disposed at a suitable interval (e.g., a predetermined interval).

As described above with reference to FIG. 10, a width of a portion of the second bridge pattern 242 may be changed, so as to reduce a capacitance between the second bridge pattern 242 and the first bridge patterns 212. Accordingly, an interval of a visibility cut, such as the internal end portions PTE3, may be changed, or a density of an upper gap may be changed in a region in which the second bridge pattern 242 is disposed. In this case, the second bridge pattern 242 may be more likely to be viewed. According to an embodiment of the present disclosure, the end portions 242E in a region in which the second bridge pattern 242 is disposed and the end portions PTE1 facing the end portions 242E may be formed to have a curvature, and thus, the second bridge pattern 242 may be less likely to be viewed.

Figure 15:
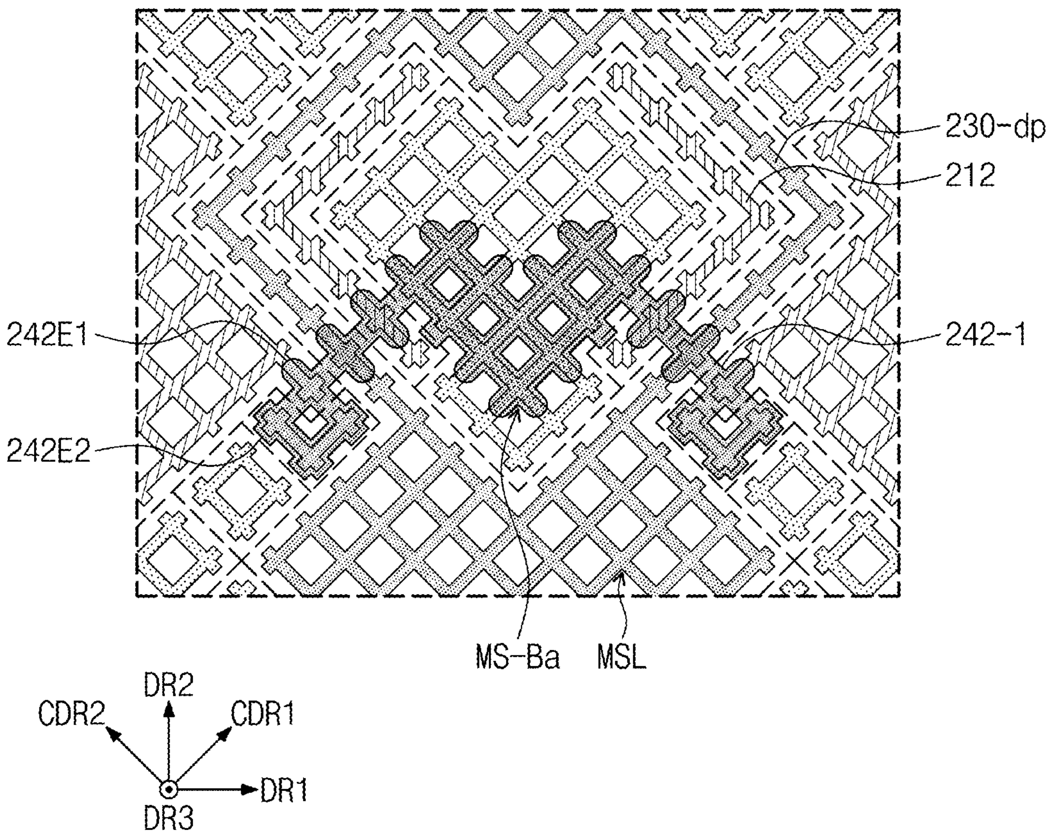
FIG. 15 is a plan view illustrating a second bridge pattern included in a second conductive layer and a first conductive layer according to an embodiment of the present disclosure.

FIG. 15 is a plan view illustrating a second bridge pattern 242-1 included in the second conductive layer SU204 and a portion of the first conductive layer SU202 according to an embodiment of the present disclosure.

Referring to FIG. 15, the second bridge pattern 242-1 may include a plurality of bridge mesh lines MS-Ba.

In an embodiment of the present disclosure, end portions 242E1 and 242E2 of the bridge mesh lines MS-Ba may include a first-type end portion 242E1 and a second-type end portion 242E2. The first-type end portion 242E1 may have a curvature, and the second-type end portion 242E2 may have a straight-line shape.

The first-type end portion 242E1 may overlap with one second mesh line included in second mesh lines MSL, and the second-type end portion 242E2 may not overlap with the second mesh lines MSL. In other words, among end portions of the bridge mesh lines MS-Ba, a portion overlapping with a gap of the second mesh lines MSL may be the second-type end portion 242E2, and a portion overlapping with the second mesh lines MSL may be the first-type end portion 242E1.

Figure 16:
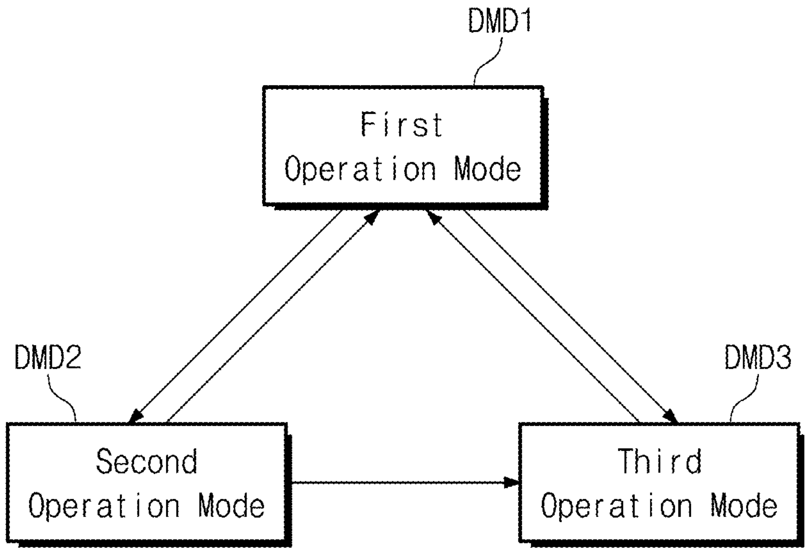
FIG. 16 is a diagram illustrating an operation of a sensor driver according to an embodiment of the present disclosure.

FIG. 16 is a diagram illustrating an operation of the sensor driver 200C according to an embodiment of the present disclosure.

Referring to FIGS. 5 and 16, the sensor driver 200C may be selectively driven in any one among a first operation mode DMD1, a second operation mode DMD2, and a third operation mode DMD3.

The first operation mode DMD1 may be referred to as a touch and pen waiting mode, the second operation mode DMD2 may be referred to as a touch activating and pen waiting mode, and the third operation mode DMD3 may be referred to as a pen activating mode. The first operation mode DMD1 may be a mode for waiting for the first input 2000 and the second input 3000. The second operation mode DMD2 may be a mode for sensing the first input 2000 and waiting for the second input 3000. The third operation mode DMD3 may be a mode for sensing the second input 3000.

In an embodiment of the present disclosure, the sensor driver 200C may be driven in the first operation mode DMD1 first. When the first input 2000 is sensed in the first operation mode DMD1, the sensor driver 200C may be switched (e.g., changed) to the second operation mode DMD2. As another example, when the second input 3000 is sensed in the first operation mode DMD1, the sensor driver 200C may be switched (e.g., changed) to the third operation mode DMD3.

In an embodiment of the present disclosure, when the second input 3000 is sensed in the second operation mode DMD2, the sensor driver 200C may be switched to the third operation mode DMD3. When the first input 2000 is released (e.g., not sensed) in the second operation mode DMD2, the sensor driver 200C may be switched to the first operation mode DMD1. When the second input 3000 is released (e.g., not sensed) in the third operation mode DMD3, the sensor driver 200C may be switched to the first operation mode DMD1.

Figure 17:
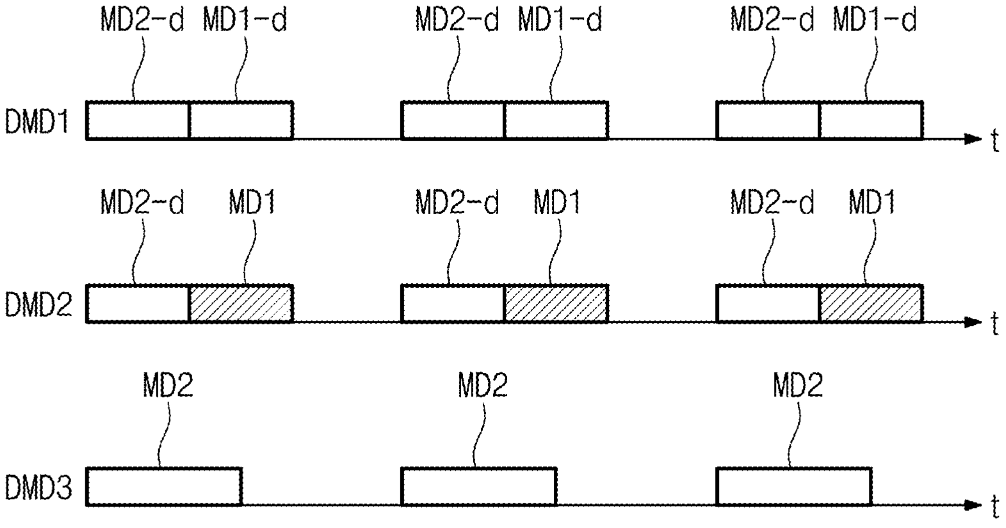
FIG. 17 is a diagram illustrating an operation of a sensor driver according to an embodiment of the present disclosure.

FIG. 17 is a diagram illustrating an operation of the sensor driver 200C according to an embodiment of the present disclosure.

Referring to FIGS. 5, 16, and 17, an operation in the first to third operation modes DMD1, DMD2, and DMD3 is illustrated in a time t sequence.

The sensor driver 200C may be repeatedly driven in a second mode MD2-*d* and a first mode MD1-*d* in the first operation mode DMD1. The sensor layer 200 may be scan driven so as to detect the second input 3000 during the second mode MD2-*d*. The sensor layer 200 may be scan driven so as to detect the first input 2000 during the first mode MD1-*d*. FIG. 17 illustrates that the sensor driver 200C is driven in the second mode MD2-*d*, and then consecutively driven in the first mode MD1-*d*, but the sequence thereof is not limited thereto.

The sensor driver 200C may be repeatedly driven in a second mode MD2-*d* and a first mode MD1 in the second operation mode DMD2. The sensor layer 200 may be scan driven so as to detect the second input 3000 during the second mode MD2-*d*. The sensor layer 200 may be scan driven so as to detect a coordinate based on the first input 2000 during the first mode MD1.

The sensor driver 200C may be driven in a second mode MD2 in the third operation mode DMD3. The sensor layer 200 may be scan driven so as to detect a coordinate based on the second input 3000 during the second mode MD2. The sensor driver 200C may not operate in a first mode MD1-*d* or MD1 until the second input 3000 is released (e.g., not sensed) in the third operation mode DMD3.

Referring to FIG. 7 together, the third electrodes 230 and the fourth electrodes 240 may be all grounded, or a constant voltage may be applied thereto in the first mode MD1-*d* and the first mode MD1. As another example, the third electrodes 230 and the fourth electrodes 240 may be all floated (e.g., electrically floated) in the first mode MD1-*d* and the first mode MD1. As another example, a signal having the same phase as that of a transmission signal provided to the first electrodes 210 may be applied to the third electrodes 230 and the fourth electrodes 240 in the first mode MD1-*d* and the first mode MD1. In this case, a touch noise may be prevented from being introduced through the third electrodes 230 and the fourth electrodes 240.

One end of each of the fourth electrodes 240 and the third electrodes 230 may be floated in the second mode MD2-*d* and the second mode MD2. In addition, another end of each of the fourth electrodes 240 and the third electrodes 230 may be grounded or floated in the second mode MD2-*d* and the second mode MD2. Thus, compensation for a sensing signal may be maximized or improved due to a coupling between the first electrodes 210 and the third electrodes 230 and a coupling between the second electrodes 220 and the fourth electrodes 240.

Figure 18:
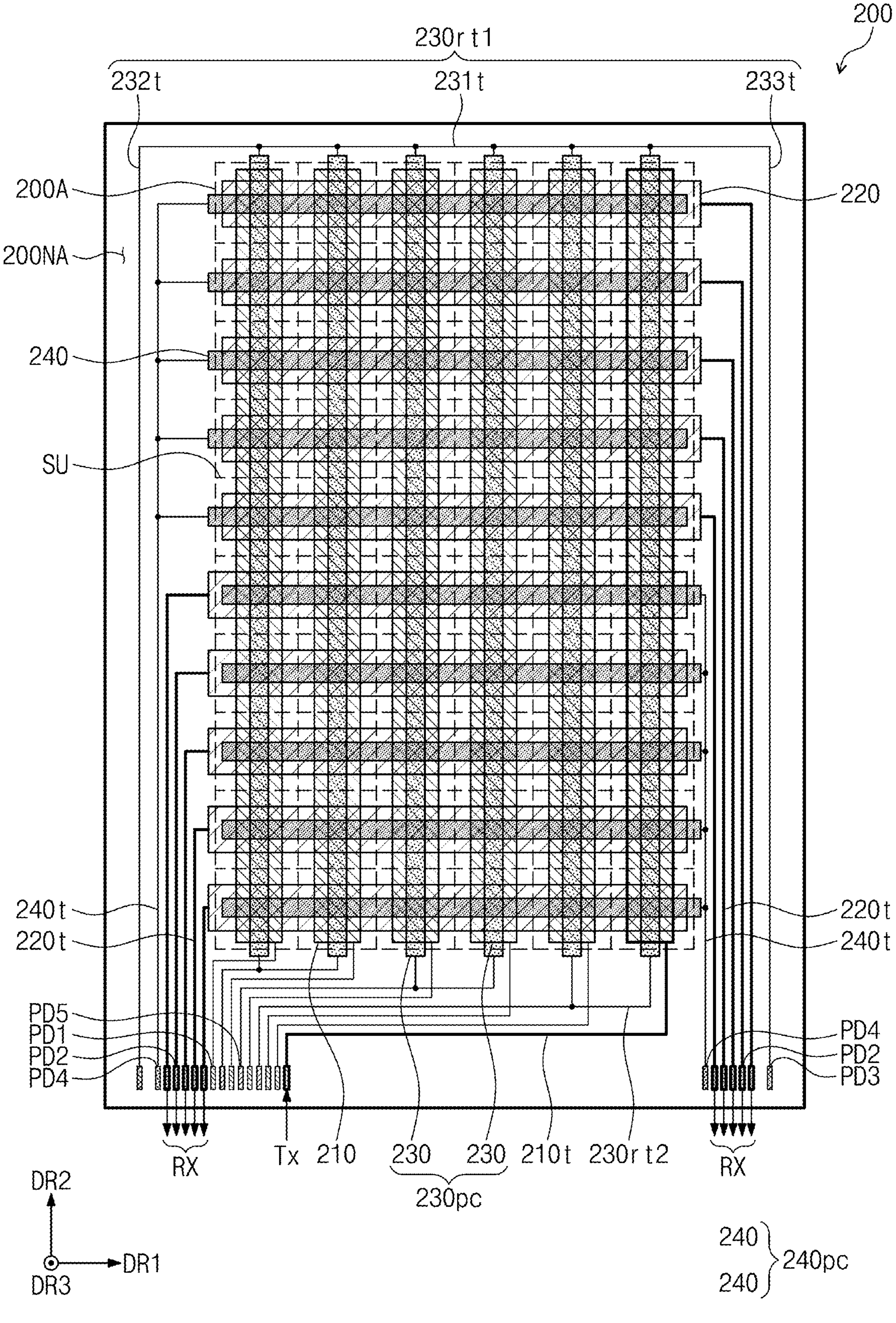
FIG. 18 is a diagram illustrating a first mode according to an embodiment of the present disclosure.

FIG. 18 is a diagram illustrating a first mode according to an embodiment of the present disclosure.

Referring to FIGS. 5, 17, and 18, the first mode MD1-*d* of the first operation mode DMD1 and the first mode MD1 of the second operation mode DMD2 may include a mutual capacitance detecting mode. FIG. 18 is a diagram illustrating the mutual capacitance detecting mode in the first mode MD1-*d* of the first operation mode DMD1 and the first mode MD1 of the second operation mode DMD2.

In the mutual capacitance detecting mode, the sensor driver 200C may sequentially provide a transmission signal TX to first electrodes 210, and may detect a coordinate based on the first input 2000 by using a reception signal RX detected through second electrodes 220. For example, the sensor driver 200C may sense a change in a mutual capacitance between the first electrodes 210 and the second electrodes 220, and may calculate an input coordinate.

FIG. 18 illustrates that the transmission signal TX is provided to one first electrode 210, and the reception signal RX is output from the second electrodes 220. For convenience of illustration of a signal, one first electrode 210 to which the transmission signal TX is provided in bold in FIG. 18. The sensor driver 200C may sense a change in a capacitance between the first electrode 210 and each of the second electrodes 220, and may detect an input coordinate based on the first input 2000.

In another embodiment of the present disclosure, at least any one of the first mode MD1-*d* of the first operation mode DMD1 or the first mode MD1 of the second operation mode DMD2 may further include a self-capacitance detecting mode. The sensor driver 200C may output driving signals to the first electrodes 210 and the second electrodes 220, may sense a change in a capacitance of each of the first electrodes 210 and the second electrodes 220, and may calculate an input coordinate in the self-capacitance detecting mode.

Figure 19:
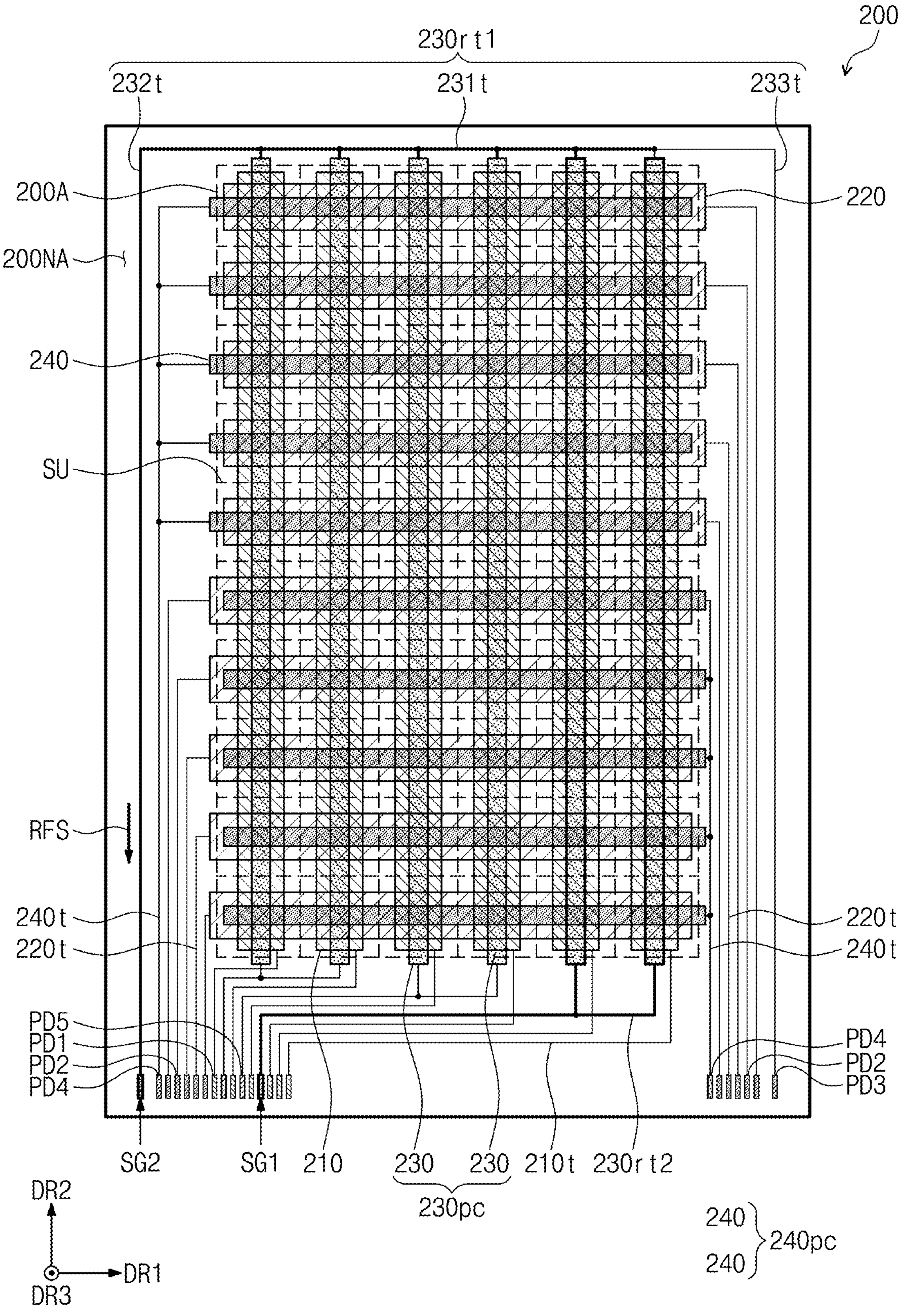
FIG. 19 is a diagram illustrating a second mode according to an embodiment of the present disclosure.
Figure 20A:
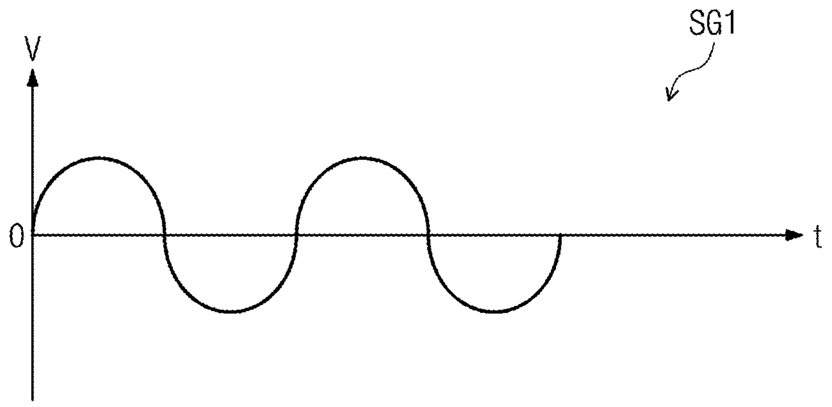
FIG. 20A is a graph showing a waveform of a first signal according to an embodiment of the present disclosure.
Figure 20B:
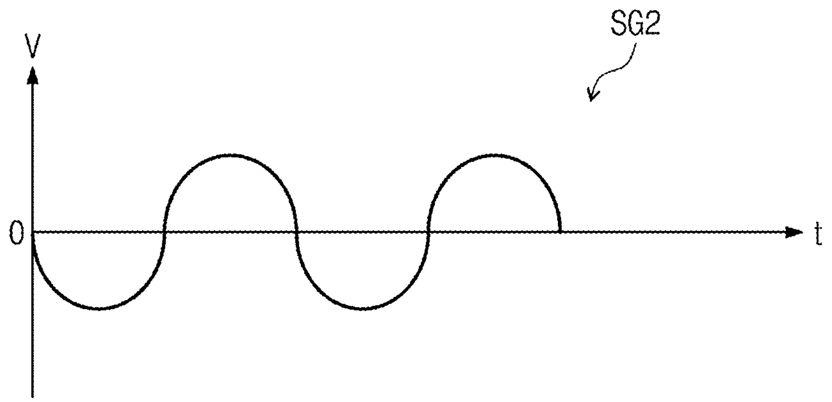
FIG. 20B is a graph showing a waveform of a second signal according to an embodiment of the present disclosure.

FIG. 19 is a diagram illustrating a second mode according to an embodiment of the present disclosure. FIG. 20A is a graph showing a waveform of a first signal according to an embodiment of the present disclosure. FIG. 20B is a graph showing a waveform of a second signal according to an embodiment of the present disclosure. FIG. 19 may be a diagram illustrating a charge driving mode of the second mode.

Referring to FIGS. 19, 20A, and 20B, the second mode MD2 may include a charge driving mode. The charge driving mode may include a searching charge driving mode and a tracking charge driving mode.

The searching charge driving mode may be a driving mode before sensing a position of a pen. Thus, a first signal SG1 or a second signal SG2 may be sequentially provided to all channels included in a sensor layer 200. In other words, an entire region of the sensor layer 200 may be sequentially scanned in the searching charge driving mode. When the pen PN is sensed in the searching charge driving mode, the sensor layer 200 may be tracking charge driven. For example, the sensor driver 200C may sequentially output the first signal SG1 and the second signal SG2 to a region overlapping with not an entire sensor layer 200, but to a point at which the pen PN is sensed in the tracking charge driving mode.

The sensor driver 200C may apply the first signal SG1 to one pad among fifth pads PD5 and third pads PD3, and may apply the second signal SG2 to another pad. The second signal SG2 may be a reverse phase signal of the first signal SG1. For example, the first signal SG1 may be a sinusoidal wave signal.

A current RFS may have a current path flowing through one pad to another pad, since the first signal SG1 and the second signal SG2 are applied to at least two pads. In addition, a direction of the current RFS may periodically change, since the first signal SG1 and the second signal SG2 may be sinusoidal wave signals in reverse phase relationship with each other. In another embodiment of the present disclosure, the first signal SG1 and the second signal SG2 may be square wave signals in reverse phase relationship with each other.

In a case in which the first signal SG1 and the second signal SG2 are in reverse phase relationship with each other, a noise caused in the display layer 100 (e.g., see FIG. 4) by the first signal SG1 may be offset against a noise caused by the second signal SG2. Thus, a flicker phenomenon may not occur in the display layer 100, and a display quality of the display layer 100 may be improved.

In an embodiment of the present disclosure, the first signal SG1 may be a sinusoidal wave signal. However, the present disclosure is not limited thereto, and the first signal SG1 may be a square wave signal. Furthermore, in another embodiment, the second signal SG2 may have a constant voltage (e.g., a predetermined constant voltage). For example, the second signal SG2 may be a ground voltage. In other words, a pad to which the second signal SG2 is applied may be considered as being grounded. In this case, the current RFS may also flow from one pad to another pad. In addition, even if another pad is grounded, a direction of the current RFS may periodically change, since the first signal SG1 is a sinusoidal wave signal or a square wave signal.

FIG. 19 illustrates that the second signal SG2 is provided to one third pad PD3 connected to one third trace line 230*rt*1, and the first signal SG1 is provided to one fifth pad PD5 connected to a third electrode 230. The current RFS may flow through a current path defined by the fifth pad PD5, a fifth trace line 230*rt*2 connected to the fifth pad PD5, the third electrode 230, a portion of the third trace line 230*rt*1 connected to the third pad PD3, and the third pad PD3. The current path may have a coil form. Thus, a resonant circuit of the pen PN may be charged by the current path in the charge driving mode of the second mode.

According to some embodiments of the present disclosure, a current path of a loop coil pattern may be embodied by the components included in the sensor layer 200. Thus, the electronic device 1000 (e.g., see FIG. 1A) may charge the pen PN by using the sensor layer 200. As such, because it may not be necessary to separately add a component having a coil for charging the pen PN, an increase in a thickness, an increase in a weight, and a deterioration in a flexibility of the electronic device 1000 due to an additional component may not occur.

First electrodes 210, second electrodes 220, and fourth electrodes 240 may be grounded, may be applied with a constant voltage, or may be electrically floated in the charge driving mode. In more detail, the first electrodes 210, the second electrodes 220, and the fourth electrodes 240 may be floated. In this case, the current RFS may not flow to the first electrodes 210, the second electrodes 220, and the fourth electrodes 240.

Figure 21A:
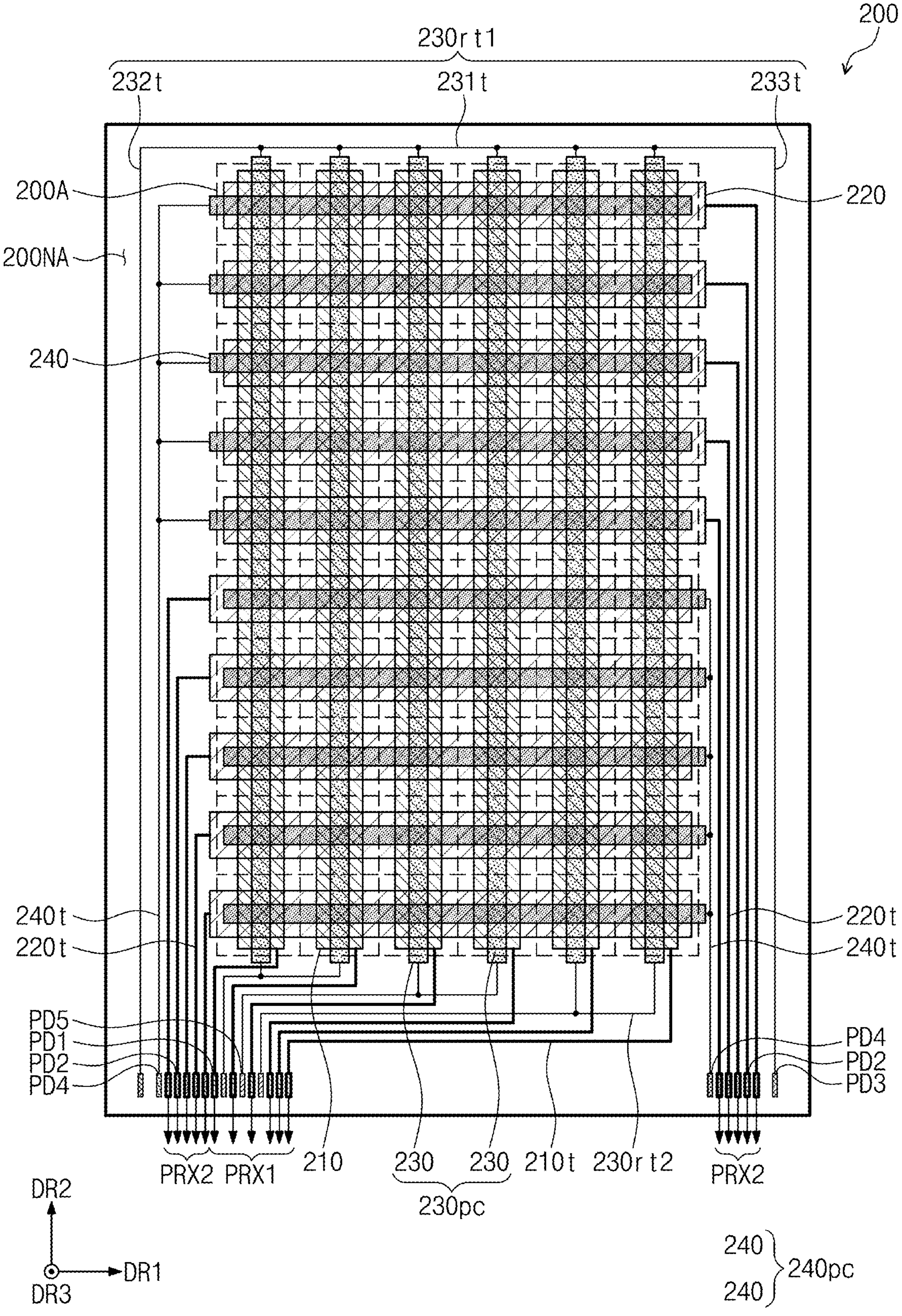
FIG. 21A is a diagram illustrating a second mode according to an embodiment of the present disclosure.
Figure 21B:
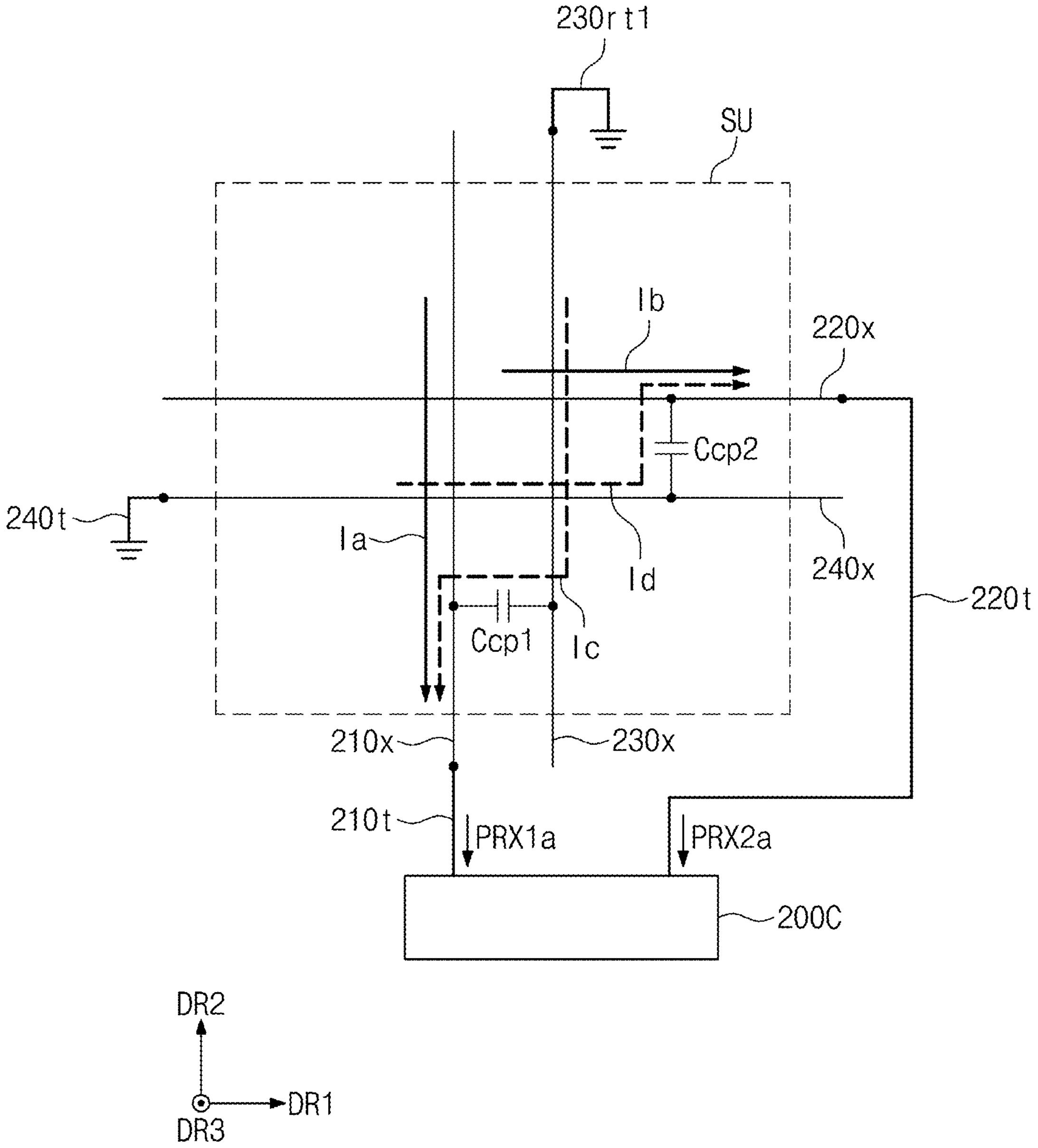
FIG. 21B is a diagram illustrating a second mode on the basis of one sensing unit according to an embodiment of the present disclosure.

FIG. 21A is a diagram illustrating a second mode according to an embodiment of the present disclosure. FIG. 21B is a diagram illustrating a second mode on the basis of one sensing unit according to an embodiment of the present disclosure.

Referring to FIGS. 21A and 21B, the second mode may include a charge driving mode and a pen sensing driving mode. FIGS. 21A and 21B are diagrams illustrating the pen sensing driving mode. Referring to FIG. 21A, in the pen sensing driving mode, first reception signals PRX1 may be output from the first electrodes 210, and second reception signals PRX2 may be output from the second electrodes 220. FIG. 21B illustrates one sensing unit SU in which first to fourth induced currents Ia, Ib, Ic, and Id generated by the pen PN flow.

In an embodiment of the present disclosure, routing directions of one electrode and another electrode of a sensor layer 200 overlapping with each other may be different from each other. For example, a routing direction of a first electrode 210*x* and a routing direction of a third electrode 230*x* may be different from each other. In addition, a routing direction of a second electrode 220*x* and a routing direction of a fourth electrode 240*x* may be different from each other. For example, in FIG. 21B, the first electrode 210*x* and a first trace line 210*t* may be connected to each other below the sensing unit SU, and the third electrode 230*x* and a third trace line 230*rt*1 may be connected to each other above the sensing unit SU. The second electrode 220*x* and a second trace line 220*t* may be connected to each other on a right side of the sensing unit SU, and the fourth electrode 240*x* and a fourth trace line 240*t* may be connected to each other on a left side of the sensing unit SU.

A RLC resonant circuit of the pen PN may emit a magnetic field having a resonant frequency while discharging a charged charge. Due to the magnetic field provided from the pen PN, the first induced current Ia may be generated in the first electrode 210*x*, and the second induced current Ib may be generated in the second electrode 220*x*. In addition, the third induced current Ic may be generated in the third electrode 230*x*, and the fourth induced current Id may be generated in the fourth electrode 240*x*.

A first coupling capacitance Ccp1 may be formed between the third electrode 230*x* and the first electrode 210*x*, and a second coupling capacitance Ccp2 may be formed between the fourth electrode 240*x* and the second electrode 220*x*. The third induced current Ic may be transmitted to the first electrode 210*x* through the first coupling capacitance Ccp1, and the fourth induced current Id may be transmitted to the second electrode 220*x* through the second coupling capacitance Ccp2.

The sensor driver 200C may receive a first reception signal PRX1*a* based on the first induced current Ia and the third induced current Ic from the first electrode 210*x*, and may receive a second reception signal PRX2*a* based on the second induced current Ib and the fourth induced current Id from the second electrode 220*x*. The sensor driver 200C may detect an input coordinate of the pen PN on the basis of the first reception signal PRX1*a* and the second reception signal PRX2*a*.

The sensor driver 200C may receive the first reception signal PRX1*a* from the first electrode 210*x*, and may receive the second reception signal PRX2*a* from the second electrode 220*x*. One end of each of the third electrode 230*x* and the fourth electrode 240*x* may be floated. Thus, compensation for a sensing signal may be maximized or improved due to a coupling between the first electrode 210*x* and the third electrode 230*x* and a coupling between the second electrode 220*x* and the fourth electrode 240*x*.

In addition, another end of each of the third electrode 230*x* and the fourth electrode 240*x* may be grounded or floated. Thus, the third induced current Ic and the fourth induced current Id may be sufficiently transmitted to the first electrode 210*x* and the second electrode 220*x* due to a coupling between the first electrode 210*x* and the third electrode 230*x* and a coupling between the second electrode 220*x* and the fourth electrode 240*x*.

According to some embodiments of the present disclosure described above, not only a touch input, but also an input by a pen, may be sensed by using a sensor layer. Thus, because it may not be necessary to add a separate component (e.g., a digitizer) for pen sensing to an electronic device, an increase in a thickness, an increase in a weight, and a deterioration in a flexibility of the electronic device due to an addition of a digitizer may not occur. In addition, an upper mesh line of the sensor layer may include end portions facing each other, and a portion of a lower conductive pattern, for example, such as a lower mesh line, may be exposed in a space, or in other words, in a gap, between the end portions facing each other. In this case, light travelling in a direction (e.g., a predetermined direction) may be reflected at the lower mesh line and the end portions. According to some embodiments of the present disclosure, the end portions may each have a curvature. Thus, an amount of a reflection of light at the end portions or a region adjacent to the end portions may be reduced. As such, a visibility of a pattern due to external light reflection may be reduced, and the electronic device having an improved visibility may be provided.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:

a first electrode comprising a plurality of first patterns, and a first bridge pattern electrically connected to the plurality of first patterns;

a second electrode crossing the first electrode;

a third electrode overlapping with at least a portion of the first electrode; and a fourth electrode crossing the third electrode, and comprising a plurality of second patterns, and a second bridge pattern electrically connected to the plurality of second patterns, wherein the first bridge pattern, the third electrode, and the plurality of second patterns are included in a first conductive layer, wherein the plurality of first patterns, the second electrode, and the second bridge pattern are included in a second conductive layer on the first conductive layer, and wherein each of the plurality of first patterns, the second electrode, and the second bridge pattern comprises a plurality of first mesh lines, and at least some of a plurality of first end portions of the plurality of first mesh lines have a curvature, wherein each of the first bridge pattern, the third electrode, and the plurality of second patterns comprises a plurality of second mesh lines, and wherein at least some of a plurality of second end portions of the second mesh lines have a different shape from those of the at least some of the plurality of first end portions having the curvature.

2. The electronic device of claim 1, wherein the at least some of the plurality of second end portions of the plurality of second mesh lines have a straight-line shape.

3. The electronic device of claim 2, wherein the plurality of second end portions are covered by the plurality of first mesh lines.

4. The electronic device of claim 1, wherein a portion of the plurality of second mesh lines overlaps with a gap between two first end portions facing each other from among the plurality of first end portions.

5. The electronic device of claim 4, wherein an edge of the portion of the plurality of second mesh lines has a curvature.

6. The electronic device of claim 1, wherein the plurality of first end portions comprise a first end portion having the curvature, and a second end portion having a straight-line shape.

7. The electronic device of claim 6, wherein the plurality of second mesh lines comprises a first lower mesh line and a second lower mesh line, wherein the first lower mesh line protrudes and extends from the first end portion, and wherein the second lower mesh line comprises a lower end portion having a straight-line shape, the second lower mesh line does not overlap with the second end portion, and the lower end portion is spaced from the second end portion.

8. The electronic device of claim 1, wherein the plurality of first mesh lines comprises a plurality of bridge mesh lines included in the second bridge pattern, and wherein an end portion of each of the plurality of bridge mesh lines has a curvature.

9. The electronic device of claim 8, wherein the plurality of first mesh lines comprises a plurality of pattern mesh lines included in the plurality of first patterns and the second electrode, and wherein an end portion of each of the plurality of pattern mesh lines has a curvature.

10. The electronic device of claim 8, wherein the plurality of first mesh lines comprises a plurality of pattern mesh lines included in the plurality of first patterns and the second electrode, and from among end portions of the plurality of pattern mesh lines, end portions facing end portions of the plurality of bridge mesh lines have a curvature, and other remaining end portions have a straight-line shape.

11. The electronic device of claim 1, wherein the plurality of first mesh lines comprises a plurality of bridge mesh lines included in the second bridge pattern, wherein end portions of the plurality of bridge mesh lines comprise a first end portion and a second end portion, and wherein the first end portion has a curvature, and the second end portion has a straight-line shape.

12. The electronic device of claim 11, wherein the first end portion overlaps with one second mesh line included in the plurality of second mesh lines, and the second end portion does not overlap with the plurality of second mesh lines.

13. The electronic device of claim 1, wherein the plurality of first mesh lines comprises a plurality of pattern mesh lines included in the plurality of first patterns and the second electrode, wherein the plurality of pattern mesh lines comprises a first pattern mesh line extending in a first direction, and a second pattern mesh line extending in the first direction, wherein the first pattern mesh line and the second pattern mesh line are spaced from each other in a second direction crossing the first direction, and wherein the first pattern mesh line comprises a first pattern portion and a second pattern portion spaced from each other with a gap therebetween.

14. An electronic device comprising:

a first electrode comprising a plurality of first patterns, and a first bridge pattern electrically connected to the plurality of first patterns;

a second electrode crossing the first electrode;

a third electrode overlapping with at least a portion of the first electrode; and a fourth electrode crossing the third electrode, and comprising a plurality of second patterns, and a second bridge pattern electrically connected to the plurality of second patterns, wherein the first bridge pattern, the third electrode, and the plurality of second patterns are included in a first conductive layer, wherein the plurality of first patterns, the second electrode, and the second bridge pattern are included in a second conductive layer on the first conductive layer, wherein each of the plurality of first patterns, the second electrode, and the second bridge pattern comprises a plurality of first mesh lines, and at least some of a plurality of first end portions of the plurality of first mesh lines have a curvature, wherein the plurality of first mesh lines comprises a plurality of pattern mesh lines included in the plurality of first patterns and the second electrode, wherein the plurality of pattern mesh lines comprises a first pattern mesh line extending in a first direction, and a second pattern mesh line extending in the first direction, wherein the first pattern mesh line and the second pattern mesh line are spaced from each other in a second direction crossing the first direction, wherein the first pattern mesh line comprises a first pattern portion and a second pattern portion spaced from each other with a gap therebetween, wherein the second pattern mesh line comprises a third pattern portion, a compensation portion, and a fourth pattern portion spaced from the third pattern portion with the compensation portion therebetween, and wherein the compensation portion faces the gap in the second direction, and an edge of the compensation portion has a curvature.

15. The electronic device of claim 14, wherein a width of the compensation portion is greater than a width of the third pattern portion.

16. The electronic device of claim 14, wherein an end portion of the first pattern portion and an end portion of the second pattern portion facing each other have a curvature.

17. An electronic device comprising:

a display layer;

a first conductive layer on the display layer, and comprising a plurality of lower mesh lines; and a second conductive layer on the first conductive layer, and comprising a plurality of upper mesh lines, wherein at least some of a plurality of first end portions of the plurality of upper mesh lines have a curvature, and wherein a plurality of second end portions of the plurality of lower mesh lines are covered by the plurality of upper mesh lines, and a portion of the plurality of lower mesh lines overlaps with a gap between two first end portions facing each other from among the plurality of first end portions.

18. The electronic device of claim 17, wherein at least some of the plurality of second end portions have a straight-line shape.

19. The electronic device of claim 17, wherein the plurality of first end portions comprises a first end portion having the curvature, and a second end portion having a straight-line shape, wherein the plurality of lower mesh lines comprises a first lower mesh line and a second lower mesh line, wherein the first lower mesh line protrudes and extends from the first end portion, and wherein the second lower mesh line comprises a lower end portion having a straight-line shape, the second lower mesh line does not overlap with the second end portion, and the lower end portion is spaced from the second end portion.

* * * * *